United States Patent
Foster et al.

(10) Patent No.: US 12,039,504 B1
(45) Date of Patent: Jul. 16, 2024

(54) MOBILE CHECK DEPOSIT

(71) Applicant: U.S. Bank National Association, Minneapolis, MN (US)

(72) Inventors: Marlen L. Foster, Fairfield, CA (US); Connie K. Yung, San Francisco, CA (US); Vijay Narayanan, San Jose, CA (US); Raj M. Bharadwaj, Plymouth, MN (US); Soumitri Naga Kolavennu, Plymouth, MN (US); Jessica G. Winberg, Prescott, WI (US); Balasubramanian Narayanan, Eagan, MN (US); Hima Rama Subrahmanyam Vishnubhotla, Suwanee, GA (US)

(73) Assignee: U.S. Bank National Association, Minneapolis, MN (US)

(*) Notice: Subject to any disclaimer, the term of this patent is extended or adjusted under 35 U.S.C. 154(b) by 0 days.

(21) Appl. No.: 18/466,347

(22) Filed: Sep. 13, 2023

(51) Int. Cl.
G06Q 20/04 (2012.01)
G06Q 20/10 (2012.01)
(Continued)

(52) U.S. Cl.
CPC ....... *G06Q 20/0425* (2013.01); *G06Q 20/108* (2013.01); *G06Q 20/3223* (2013.01);
(Continued)

(58) Field of Classification Search
CPC . G06Q 20/0425; G06Q 20/3223; G06Q 20/04
See application file for complete search history.

(56) References Cited

U.S. PATENT DOCUMENTS

| 6,922,487 | B2 | 7/2005 | Dance et al. |
| 7,028,886 | B1 | 4/2006 | Maloney |

(Continued)

FOREIGN PATENT DOCUMENTS

| CA | 2773730 | 4/2012 |
| CN | 1897644 A | 1/2007 |

(Continued)

OTHER PUBLICATIONS

"Henkel et al., Remote Deposit in the Consumer's Hands, IEEE Xplore, Jun. 10, 2010, entire document" (Year: 2010).*

(Continued)

*Primary Examiner* — Adam Hilmantel
(74) *Attorney, Agent, or Firm* — Merchant & Gould P.C.

(57) ABSTRACT

Methods and systems for remote check deposit are disclosed. A check image captured by an image capture device of a mobile device in response to receiving a user actuation causing the image capture device to capture the check image is received. The mobile device is caused to perform optical character recognition (OCR) on the check image to generate OCR data. The OCR data generated from the check image is verified to determine whether it includes required predetermined check data to process the check for remote deposit. The OCR data is provided to a financial institution server for validation processing. In response to receiving a confirmation from a user, the check image is provided to the financial instruction server with instructions to process the check for remote deposit. The mobile device receives a deposit receipt notification from the financial institution server after the check is deposited.

19 Claims, 22 Drawing Sheets

(51) Int. Cl.
*G06Q 20/32* (2012.01)
*G06Q 20/40* (2012.01)
*G06Q 20/42* (2012.01)
*G06Q 40/02* (2023.01)
*G06V 30/19* (2022.01)
*G06V 30/224* (2022.01)

(52) U.S. Cl.
CPC ....... *G06Q 20/326* (2020.05); *G06Q 20/4016* (2013.01); *G06Q 20/42* (2013.01); *G06Q 40/02* (2013.01); *G06V 30/19013* (2022.01); *G06V 30/19093* (2022.01); *G06V 30/1916* (2022.01); *G06V 30/2253* (2022.01)

(56) References Cited

U.S. PATENT DOCUMENTS

| | | |
|---|---|---|
| 7,120,461 B2 | 10/2006 | Cho |
| 7,168,614 B2 | 1/2007 | Kotovich et al. |
| 7,201,323 B2 | 4/2007 | Kotovich et al. |
| 7,249,717 B2 | 7/2007 | Kotovich et al. |
| 7,377,425 B1 | 5/2008 | Ma et al. |
| 7,392,935 B2 | 7/2008 | Byrne et al. |
| 7,416,112 B2 | 8/2008 | Smith et al. |
| 7,424,218 B2 | 9/2008 | Baudisch et al. |
| 7,430,310 B2 | 9/2008 | Kotovich et al. |
| 7,620,604 B1 | 11/2009 | Bueche, Jr. |
| 7,653,183 B2 | 1/2010 | Patel et al. |
| 7,680,739 B1* | 3/2010 | Venturo ................. G06Q 40/02 |
| | | 705/45 |
| 7,698,222 B1 | 4/2010 | Bueche, Jr. |
| 7,711,176 B2 | 5/2010 | Rossignoli |
| 7,778,457 B2 | 8/2010 | Nepomniachtchi et al. |
| 7,792,752 B1 | 9/2010 | Kay |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,896,232 B1 | 3/2011 | Prasad et al. |
| 7,900,822 B1 | 3/2011 | Prasad et al. |
| 7,912,785 B1 | 3/2011 | Kay |
| 7,949,176 B2 | 5/2011 | Nepomniachtchi |
| 7,949,587 B1 | 5/2011 | Morris et al. |
| 7,953,268 B2 | 5/2011 | Nepomniachtchi |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,312 B1 | 8/2011 | Beck et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,000,514 B2 | 8/2011 | Nepomniachtchi et al. |
| 8,001,051 B1 | 8/2011 | Smith et al. |
| 8,046,301 B1 | 10/2011 | Smith et al. |
| 8,235,284 B1 | 8/2012 | Prasad et al. |
| 8,290,237 B1 | 10/2012 | Burks et al. |
| 8,320,657 B1 | 11/2012 | Burks et al. |
| 8,326,015 B2 | 12/2012 | Nepomniachtchi |
| 8,351,677 B1 | 1/2013 | Oakes, III et al. |
| 8,351,678 B1 | 1/2013 | Medina, III |
| 8,358,826 B1 | 1/2013 | Medina, III et al. |
| 8,374,963 B1 | 2/2013 | Billman |
| 8,379,914 B2 | 2/2013 | Nepomniachtchi et al. |
| 8,391,599 B1 | 3/2013 | Medina, III |
| 8,392,332 B1 | 3/2013 | Oakes, III et al. |
| 8,422,758 B1 | 4/2013 | Bueche, Jr. |
| 8,433,127 B1 | 4/2013 | Harpel et al. |
| 8,452,689 B1 | 5/2013 | Medina, III |
| 8,464,933 B1 | 6/2013 | Prasad et al. |
| 8,483,473 B2 | 7/2013 | Roach et al. |
| 8,538,124 B1 | 9/2013 | Harpel et al. |
| 8,542,921 B1 | 9/2013 | Medina |
| 8,577,118 B2 | 11/2013 | Nepomniachtchi et al. |
| 8,582,862 B2 | 11/2013 | Nepomniachtchi et al. |
| 8,611,635 B1 | 12/2013 | Medina, III |
| 8,620,058 B2 | 12/2013 | Nepomniachtchi et al. |
| 8,688,579 B1* | 4/2014 | Ethington ............ G06V 30/416 |
| | | 705/42 |
| 8,699,779 B1 | 4/2014 | Prasad et al. |
| 8,708,227 B1 | 4/2014 | Oakes, III et al. |
| 8,724,924 B2 | 5/2014 | Nepomniachtchi et al. |
| 8,732,081 B1 | 5/2014 | Oakes, III et al. |
| 8,799,147 B1 | 8/2014 | Walls et al. |
| 8,837,806 B1 | 9/2014 | Ethington et al. |
| 8,944,234 B1* | 2/2015 | Csulits ..................... G07D 7/12 |
| | | 382/140 |
| 8,959,033 B1 | 2/2015 | Oakes, III et al. |
| 8,977,571 B1 | 3/2015 | Bueche, Jr. et al. |
| 8,983,170 B2 | 3/2015 | Nepomniachtchi et al. |
| 9,058,512 B1 | 6/2015 | Medina, III |
| 9,129,340 B1 | 9/2015 | Medina, III et al. |
| 9,159,101 B1 | 10/2015 | Pollack et al. |
| 9,177,197 B1 | 11/2015 | Prasad et al. |
| 9,177,198 B1 | 11/2015 | Prasad et al. |
| 9,208,393 B2 | 12/2015 | Kotovich et al. |
| 9,224,136 B1 | 12/2015 | Oakes, III et al. |
| 9,286,514 B1 | 3/2016 | Newman |
| 9,292,737 B2 | 3/2016 | Nepomniachtchi et al. |
| 9,298,979 B2 | 3/2016 | Nepomniachtchi et al. |
| 9,324,073 B2 | 4/2016 | Nepomniachtchi et al. |
| 9,336,517 B1 | 5/2016 | Prasad et al. |
| 9,401,011 B2 | 7/2016 | Medina, III et al. |
| 9,536,139 B2 | 1/2017 | Nepomniachtchi et al. |
| 9,569,756 B1 | 2/2017 | Bueche, Jr. et al. |
| 9,619,872 B1 | 4/2017 | Medina, III et al. |
| 9,626,662 B1 | 4/2017 | Prasad et al. |
| 9,672,510 B2 | 6/2017 | Roach et al. |
| 9,679,214 B2 | 6/2017 | Kotovich et al. |
| 9,710,702 B2 | 7/2017 | Nepomniachtchi et al. |
| 9,779,297 B2 | 10/2017 | Nepomniachtchi et al. |
| 9,779,392 B1 | 10/2017 | Prasad et al. |
| 9,779,452 B1 | 10/2017 | Medina et al. |
| 9,818,090 B1 | 11/2017 | Bueche, Jr. et al. |
| 9,842,331 B2 | 12/2017 | Nepomniachtchi et al. |
| 9,886,628 B2 | 2/2018 | Nepomniachtchi et al. |
| 9,892,454 B1 | 2/2018 | Pollack et al. |
| 9,898,778 B1 | 2/2018 | Pollack et al. |
| 9,898,808 B1 | 2/2018 | Medina, III et al. |
| 9,904,848 B1 | 2/2018 | Newman |
| 9,946,923 B1 | 4/2018 | Medina |
| 10,013,605 B1 | 7/2018 | Oakes, III et al. |
| 10,013,681 B1 | 7/2018 | Oakes, III et al. |
| 10,102,583 B2 | 10/2018 | Strange |
| 10,192,108 B2 | 1/2019 | Nepomniachtchi et al. |
| 10,235,660 B1 | 3/2019 | Bueche, Jr. et al. |
| 10,275,673 B2 | 4/2019 | Kotovich et al. |
| 10,296,909 B1 | 5/2019 | Buentello et al. |
| 10,303,937 B2 | 5/2019 | Nepomniachtchi et al. |
| 10,354,235 B1 | 6/2019 | Medina, III |
| 10,360,447 B2 | 7/2019 | Nepomniachtchi et al. |
| 10,360,448 B1 | 7/2019 | Newman |
| 10,373,136 B1 | 8/2019 | Pollack et al. |
| 10,380,559 B1 | 8/2019 | Oakes, III et al. |
| 10,380,562 B1 | 8/2019 | Prasad et al. |
| 10,380,565 B1 | 8/2019 | Prasad |
| 10,380,993 B1 | 8/2019 | Salyers |
| 10,402,638 B1 | 9/2019 | Oakes, III et al. |
| 10,402,790 B1 | 9/2019 | Clark et al. |
| 10,423,826 B2 | 9/2019 | Nepomniachtchi et al. |
| 10,423,938 B1 | 9/2019 | Gaeta et al. |
| 10,460,295 B1 | 10/2019 | Oakes, III et al. |
| 10,460,381 B1 | 10/2019 | Pollack et al. |
| 10,482,432 B1 | 11/2019 | Oakes, III et al. |
| 10,504,185 B1 | 12/2019 | Buentello |
| 10,506,281 B1 | 12/2019 | Mortensen et al. |
| 10,521,781 B1 | 12/2019 | Singfield |
| 10,528,925 B2 | 1/2020 | Roach et al. |
| 10,552,810 B1* | 2/2020 | Ethington ............ G06Q 20/042 |
| 10,558,972 B2 | 2/2020 | Nepomniachtchi et al. |
| 10,574,879 B1 | 2/2020 | Prasad et al. |
| 10,607,073 B2 | 3/2020 | Nepomniachtchi et al. |
| 10,621,559 B1 | 4/2020 | Oakes, III et al. |

(56) References Cited

U.S. PATENT DOCUMENTS

| | | |
|---|---|---|
| 10,621,660 B1 | 4/2020 | Medina et al. |
| 10,685,223 B2 | 6/2020 | Nepomniachtchi et al. |
| 10,706,466 B1 | 7/2020 | Ethington et al. |
| 10,713,629 B1 | 7/2020 | Medina, III |
| 10,719,815 B1 | 7/2020 | Oakes, III et al. |
| 10,769,598 B1 | 9/2020 | Oakes, III et al. |
| 10,769,603 B1 | 9/2020 | Prasad et al. |
| 10,789,496 B2 | 9/2020 | Kotovich et al. |
| 10,810,561 B1 | 10/2020 | Pollack et al. |
| 10,818,282 B1 | 10/2020 | Salyers |
| 10,839,358 B1 | 11/2020 | Prasad et al. |
| 10,848,665 B1 | 11/2020 | Prasad et al. |
| 10,855,914 B1 | 12/2020 | Prasad et al. |
| 10,878,401 B2 | 12/2020 | Nepomniachtchi et al. |
| 10,896,408 B1 | 1/2021 | Prasad et al. |
| 10,909,362 B2 | 2/2021 | Nepomniachtchi et al. |
| 10,915,879 B1 | 2/2021 | Pollack et al. |
| 10,956,728 B1 | 3/2021 | Voutour |
| 11,017,478 B2 | 5/2021 | Strange |
| 11,023,719 B1 | 6/2021 | Oakes, III et al. |
| 11,030,752 B1 | 6/2021 | Backlund et al. |
| 11,062,130 B1 | 7/2021 | Medina, III |
| 11,062,131 B1 | 7/2021 | Medina, III |
| 11,062,283 B1 | 7/2021 | Prasad |
| 11,064,111 B1 | 7/2021 | Prasad et al. |
| 11,068,976 B1 | 7/2021 | Voutour et al. |
| 11,070,868 B1 | 7/2021 | Mortensen et al. |
| 11,127,008 B1 | 9/2021 | Beuentello et al. |
| 11,144,753 B1 | 10/2021 | Newman |
| 11,151,369 B2 | 10/2021 | Nepomniachtchi et al. |
| 11,157,731 B2 | 10/2021 | Nepomniachtchi et al. |
| 11,182,753 B1 | 11/2021 | Oakes, III et al. |
| 11,200,550 B1 | 12/2021 | Singfield |
| 11,348,075 B1 | 5/2022 | Oakes, III et al. |
| 11,361,286 B1 | 6/2022 | Gaeta et al. |
| 11,393,272 B2 | 7/2022 | Kriegsfeld et al. |
| 11,562,332 B1 | 1/2023 | Oakes, III et al. |
| 2005/0097046 A1 | 5/2005 | Singfield |
| 2006/0242062 A1 | 10/2006 | Peterson et al. |
| 2007/0172148 A1 | 7/2007 | Hawley |
| 2007/0183652 A1 | 8/2007 | Backstrom et al. |
| 2007/0262148 A1 | 11/2007 | Yoon et al. |
| 2008/0135609 A1 | 6/2008 | Dcosta et al. |
| 2009/0173781 A1 | 7/2009 | Ramachandran |
| 2009/0185737 A1 | 7/2009 | Nepomniachtchi |
| 2009/0236412 A1 | 9/2009 | Amorim |
| 2009/0252437 A1 | 10/2009 | Li et al. |
| 2013/0085935 A1 | 4/2013 | Nepomniachtchi et al. |
| 2013/0120595 A1 | 5/2013 | Roach et al. |
| 2013/0148862 A1 | 6/2013 | Roach et al. |
| 2013/0155474 A1 | 6/2013 | Roach et al. |
| 2013/0297353 A1 | 11/2013 | Strange et al. |
| 2014/0247998 A1 | 9/2014 | Nepomniachtchi et al. |
| 2014/0279488 A1* | 9/2014 | Drake ................ G06Q 20/3223 705/42 |
| 2015/0117747 A1 | 4/2015 | Smith et al. |
| 2016/0350590 A1 | 12/2016 | Cooper |
| 2017/0270508 A1 | 9/2017 | Roach et al. |
| 2020/0097930 A1 | 3/2020 | Roach et al. |
| 2020/0304650 A1 | 9/2020 | Roach et al. |
| 2020/0311407 A1 | 10/2020 | Nepomniachtchi et al. |
| 2020/0364480 A1 | 11/2020 | Kotovich et al. |
| 2021/0073786 A1 | 3/2021 | Nepomniachtchi et al. |
| 2021/0090086 A1* | 3/2021 | Kriegsfeld ............. G06V 10/25 |
| 2021/0090372 A1 | 3/2021 | Kriegsfeld et al. |
| 2021/0103723 A1 | 4/2021 | Nepomniachtchi et al. |
| 2021/0304318 A1 | 9/2021 | Strange |
| 2021/0360149 A1* | 11/2021 | Mukul ................... G06F 3/165 |
| 2022/0012487 A1 | 1/2022 | Nepomniachtchi et al. |
| 2022/0027613 A1 | 1/2022 | Nepomniachtchi et al. |
| 2022/0319216 A1 | 10/2022 | Kolavennu |
| 2023/0290166 A1* | 9/2023 | Roach ................... G06Q 20/10 |

FOREIGN PATENT DOCUMENTS

| | | | |
|---|---|---|---|
| EP | 1398726 | 3/2004 | |
| JP | 2004-023158 | 1/2004 | |
| WO | 2001/61436 | 8/2001 | |
| WO | 2012/051624 | 4/2012 | |
| WO | WO-2019110972 A1 * | 6/2019 | ....... G06K 19/06009 |

OTHER PUBLICATIONS

U.S. Appl. No. 18/052,081, entitled "Systems and Methods for Check Fraud Detection" filed Nov. 2, 2022, Applicant U.S. Bank National Association, 37 pages.

U.S. Appl. No. 60/795,721, entitled "Cash Dispensing and Check Accepting Automated Banking Machine System" filed Apr. 28, 2006, Inventor Mark Smith et al., 100 pages.

Video, "Deposit Checks with Your Phone", located on Oct. 20, 2023 at: https://www.chase.com/digital/customer-service/helpful-tips/online-banking/mobile/chase-quickdeposit, 1:20 in duration, JPMorgan Chase Bank, with transcript, 2021, 6 pages.

* cited by examiner

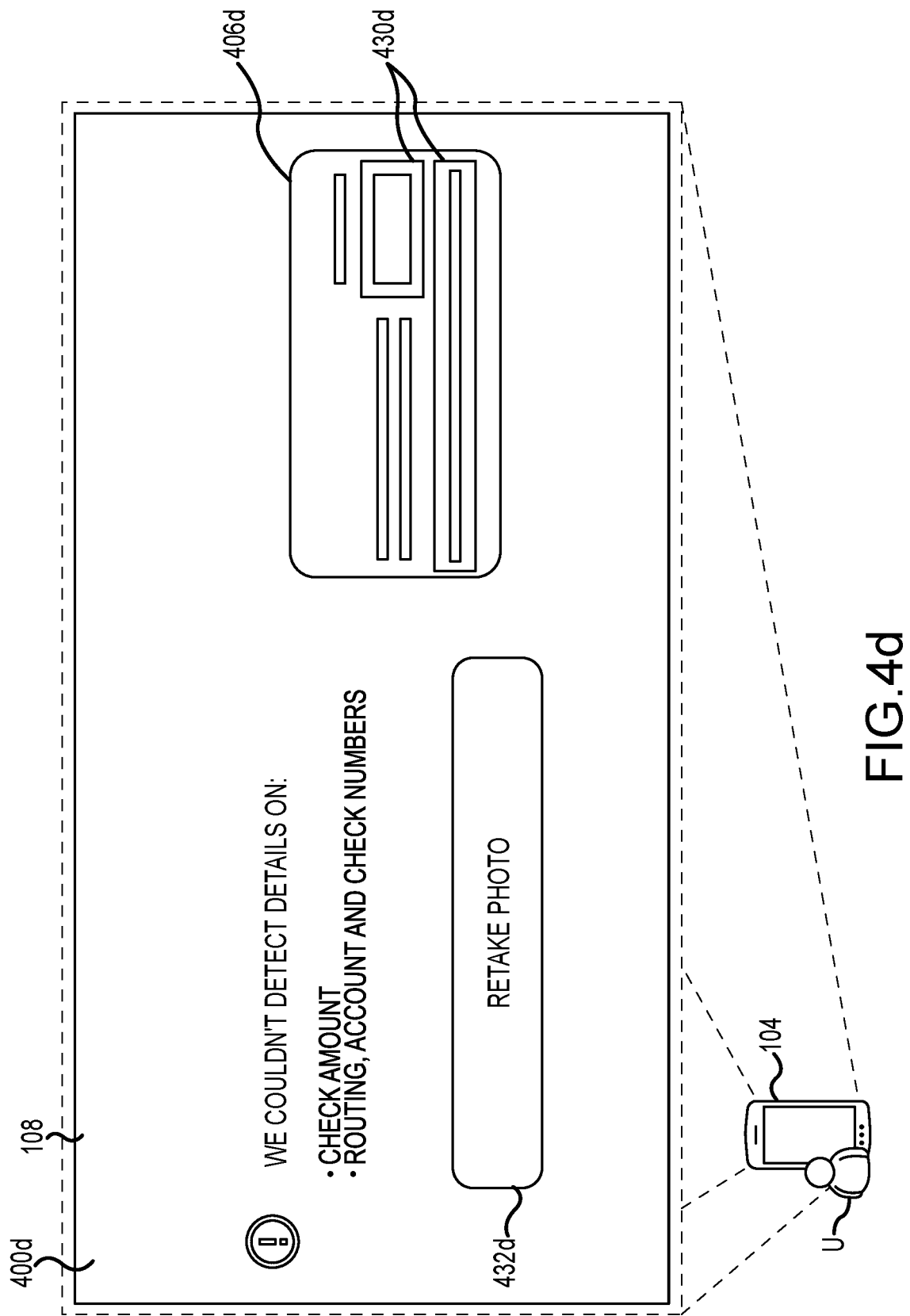

MOBILE CHECK DEPOSIT

BACKGROUND

Generally, a check is a document instructing a financial institution (e.g., a bank) to pay a specified amount of money to a specified entity (e.g., a person). In the traditional process of depositing a check, individuals personally visit a financial institution, such as a bank or credit union, with the physical check in their possession to initiate the deposit procedure. However, this conventional approach often proved to be inconvenient for many individuals. To address this issue, numerous financial institutions have introduced remote check deposit systems. This method enables users to deposit checks without the need to visit a physical financial institution.

In the traditional remote check deposit process, users take pictures of both the front and back of the check, review the pictures on their device to ensure sufficient quality, and subsequently provide these reviewed captured images to their respective financial institution. Using the information visible on these check images, the financial institution facilitates the deposit process remotely. This eliminates the requirement for individuals to personally visit the financial institution for check presentation.

Despite technological advancements aimed at capturing clear and precise images, the seemingly straightforward task of photographing the front and back of checks for remote deposit can occasionally present challenges, resulting in user difficulties or frustrations. It is with respect to these and other general considerations that embodiments have been described.

SUMMARY

In general, the present disclosure relates to methods and systems for remote check deposit using a mobile device search data pipeline. In a first aspect, example methods for remote deposit of a check include receiving a check image captured by an image capture device of a mobile device in response to receiving a user actuation causing the image capture device to capture the check image; causing the mobile device to perform optical character recognition (OCR) on the check image to generate OCR data; verifying, at the mobile device, that the OCR data generated from the check image includes required predetermined check data to process the check for remote deposit; providing the OCR data to a financial institution server for validation processing; in response to receiving a confirmation notification from the financial institution server that the OCR data has been validated: presenting, on a user interface of the mobile device, a request for confirmation from a user to process the check for remote deposit; in response to receiving a confirmation from the user to process the check for remote deposit: providing the check image to the financial instruction server with instructions to process the check for remote deposit; and receiving, at the mobile device, a deposit receipt notification from the financial institution server after the check is deposited.

In a second aspect, example systems for remote deposit of a check include a computing system operating on a mobile device including a database, a processor, and a memory communicatively coupled to the processor, the memory storing instructions executable by the processor to: receive a check image captured by an image capture device of the mobile device in response to receiving a user actuation causing the image capture device to capture the check image; cause the mobile device to perform optical character recognition (OCR) on the check image to generate OCR data; verify, at the mobile device, that the OCR data generated from the check image includes required predetermined check data to process the check for remote deposit; provide the OCR data to a financial institution server for validation processing; in response to receiving a confirmation notification from the financial institution server that the OCR data has been validated: present, on a user interface of the mobile device, a request for confirmation from a user to process the check for remote deposit; in response to receiving a confirmation from the user to process the check for remote deposit: provide the check image to the financial instruction server with instructions to process the check for remote deposit; and receive, at the mobile device, a deposit receipt notification from the financial institution server after the check is deposited.

In a third aspect, an example non-transitory computer-readable medium is described having stored thereon one or more sequences of instructions for causing one or more processors to perform: receiving a check image captured by an image capture device of a mobile device in response to receiving a user actuation causing the image capture device to capture the check image; causing the mobile device to perform optical character recognition (OCR) on the check image to generate OCR data; verifying, at the mobile device, that the OCR data generated from the check image includes required predetermined check data to process the check for remote deposit; providing the OCR data to a financial institution server for validation processing; in response to receiving a confirmation notification from the financial institution server that the OCR data has been validated: presenting, on a user interface of the mobile device, a request for confirmation from a user to process the check for remote deposit; in response to receiving a confirmation from the user to process the check for remote deposit: providing the check image to the financial instruction server with instructions to process the check for remote deposit; and receiving, at the mobile device, a deposit receipt notification from the financial institution server after the check is deposited.

In an example, a method includes obtaining an image from a camera process responsive to user actuation of a capture image user interface element. In an example, the image is not obtained automatically from the camera process. In an example, optical character recognition is performed on the mobile device. In an example, optical character recognition is performed on a third party server. In an example, the image obtained from the camera or an image derived directly therefrom is never shown to the user. In an example, the image obtained from the camera or an image derived therefrom is not shown to the user prior to sending the image to the server. In an example, a system shows a user an alternative check (e.g., illustrated or cartoon) with the OCR data in the appropriate spots. In an example, the server verifies OCR data received from the device. In an example, the server does not OCR the check. In an example, the OCR data is sent in a separate communication from the images. In an example, the OCR data is sent prior to sending the images. In an example, the OCR data is sent at least one second prior to sending the images. In an example, an account identification number is not sent from the mobile device to the server until after the user confirms the account for deposit (e.g., instead only account labels or aliases are used for account identification prior to confirming the account for deposit). In an example, initiating capture of an image occurs using a mobile device camera without specifying any parameters or settings for the camera (e.g., by using default options). In an example, if an image is not captured correctly (e.g., errors are detected), feedback is provided to the user as to what the problems are. In an example, feedback is more than simply a notification of the existence of the error and instead can take the form of superimposing feedback over an image of the actual check or a representation of a check. In an example, to protect against duplicates, the server can check images against each other to detect duplicate checks, as well as compare data extracted from check images to detect a duplicate check. In an example, to protect against duplicates (e.g., sending the same check twice), a mobile application operating on the mobile device can compare the current OCR data with prior OCR data and then not send to the server responsive to the current OCR data matching prior OCR data. In an example, defects are detected and removed from the image. In an example, separate bit planes or bit groupings are used on image data, or convolutional filters might be used. In an example, automatic edge detection is used to determine boundaries of the check or regions therein. In an example, to the extent that any visible alignment guide is presented on the screen of a mobile device, the alignment guide can remain static or adjust to the corners of a document. Background images in check images can be detected and removed. Automatic adjustment of brightness of check images can be performed, such as using a histogram used to determine a brightness correction value. Detection of a signature on the check can be performed by counting pixels in an area or using a machine learning algorithm trained on the presence or absence of signatures in a specific region of the check. In an example, template matching is used to determine the location and position of a known check template (e.g., the check template can be samples of known check design patterns) to determine which template the check follows (if none matches, then the application can infer that the image is bad). If there is a match, then the application can take known positions of check elements from the template (e.g., bounding boxes of where that data is expected to be) and then perform OCR or other recognition of the data within that region to increase accuracy of the OCR process.

In an example, auto detection of the face of the check is performed. For instance, a model is trained to identify if the face of the check that is being shown on camera view is the front of the check or back of the check. In an example, the detection can distinguish the check and provide the bounding region of the check. Based on the bounding region and face classification confidence we will be able to provide a "usability" metric of that angle of the camera at that time. In an example, usability measurements relates to how the check can be used for further processing. The usability can be a function of the angle of skew of the check object, the amount of light on the object (too dark or very bright) and quality of the check image itself. As a consequence, usable images can be captured for front processing and back processing and combine the results obtained from the plurality of frames to arrive at a final answer.

In an example, object detection and superimposed annotation display while video is in display of front objects and back objects. In addition to classification of the check a cascaded model can then perform object detection and object segmentation on the frame of the video at that time. The object detection which is (also the first step in fraud detection) can then be used to identify key aspects of the front of the check and back of the check. Further processing of the check objects is also possible; the processing could include handwriting recognition, OCR, etc. The front of the check can then reveal date, payee name, payor name and address, amount, check number, whether the check is signed, and whether the check is endorsed. In some embodiments this information can then be digitally superimposed in typed text at the correct location (for example the amount and date can be shown at appropriate location on the check). Endorse here can be digitally superimposed on the back of the check if an endorsement is missing. In other embodiments, a separate check sample can be shown to the user for confirmation of capturing the correct content.

In an example, downstream to the check image capture there are several tasks that are accomplished. These tasks can be performed with various amounts of distribution of the tasks on the mobile device or on a server or on some occasions at both places. In one extreme a captured check image could be sent to the server with no image or text processing at all. In another extreme case, all processing including object detection, face detection, de-skewing, amount and date confirmation, fraud detection can all be performed on the mobile device. In an example, there is a hybrid approach where these tasks are distributed based on the resources available on the mobile device and on the server as well as the timeliness requirement for processing. Algorithms can be scaled down to low memory and low power devices as well as devices with GPUs and other computational powers. The hybrid scheme for optimization could be based either on a policy or computed and acted on a check by check and mobile device by mobile device basis.

In an example, there is a method for remote deposit of a check. The method can include various operations, including receiving a check image captured by an image capture device of a mobile device in response to receiving a user actuation causing the image capture device to capture the check image. The method can include performing certain steps after receiving the check image and without displaying the check image to a user. The method can include, at the mobile device, causing the mobile device to perform optical character recognition (OCR) on the check image to generate first OCR data. The method can include, at the mobile device, determining that the first OCR data generated from the check image lacks required predetermined check data to process the check for remote deposit. The required predetermined check data can include an amount and MICR line data, wherein the MICR line data includes an account number and a routing number, and a check number. The method can include, at the mobile device, generating a check representation image including at least some of the first OCR data and indication provided on the check representation image at a region of the check representation image associated with lacking predetermined check data. The method can include, at the mobile device, presenting the check representation image. The method can include, at the mobile device, after presenting the check representation image, receiving a remediation. The method can include, at the mobile device, after verifying that second OCR data associated with the remediation includes the required predetermined check data, providing the second OCR data to a financial institution server for validation processing. The method can include, at the financial institution server, performing duplication detection processing using the second OCR data. The method can include, at the financial institution server, performing fraud detection processing. The method can include, at the financial institution server, after the duplication detection processing and the fraud detection processing, sending a confirmation notification that the provided second OCR data has been validated. The method can include, at the mobile device, receiving the confirmation notification from the financial institution server that the provided second OCR data has been validated. The method can include, at the mobile device, in response to receiving the confirmation notification, presenting, on a user interface of the mobile device, a request for confirmation from a user to process the check for remote deposit. The method can include, at the mobile device, receiving a user confirmation from the user in response to the request for confirmation from the user to process the check for remote deposit. The method can include, at the mobile device, in response to receiving the user confirmation from the user, providing the check image to the financial institution server with instructions to process the check for remote deposit. The method can include, at the mobile device, receiving, at the mobile device, a deposit receipt notification from the financial institution server after the check is deposited.

In an example, the remediation is user input that modifies the first OCR data to form the second OCR data. In an example, the fraud detection processing or a subsequent fraud detection processing includes a manual review responsive to the remediation being the modification of the first OCR data to form the second OCR data.

In an example, the check image is a first check image. In an example, the remediation includes receiving a second check image captured by the image capture device of the mobile device in response to receiving a user actuation causing the image capture device to capture the second check image. In an example, the remediation further includes causing the mobile device to perform OCR on the second check image to generate the second OCR data. The method can further include activating the image capture device of the mobile device. The method can further include providing instructions for the user to capture a second check image of the check.

The method can further include presenting at least a portion of the check image or an image derived from the check image to a user for a first time only after the check is deposited. Generating the check representation image can further include selecting a check representation image template and populating the template with values from the first OCR data. The method can further comprise determining whether the check image is of the front of the check. Selecting the check representation image template can include selecting a front template responsive to determining that the check image is of the front of the check. Selecting the check representation image template can include selecting the check representation image template from among a plurality of check representation image templates.

In some examples, generating the check representation image fails to preserve stylistic content from the check image. Generating the check representation image can include preserving stylistic content from the check image without directly importing stylistic elements from the check image. Preserving stylistic content without directly importing stylistic elements from the check image can include performing at least one operation selected from a set of operations consisting of: selecting a font based on handwriting in the check image; selecting a color based on an ink in the check image; selecting a scale of an element in the check representation based on a scale of a corresponding element in the check image; and selecting a position of an element in the check representation based on a scale of a corresponding element in the check image.

In an example, the portion of the check image that would contain the lacking predetermined check data is out of frame and the check representation image includes a portion that corresponds to the portion of the check image that would contain the lacking predetermined check data.

In an example, the method further includes, at the financial institution server, receiving the provided check image after the duplication detection processing and the fraud detection processing. The method can further include, at the financial institution server, causing the check to be deposited without the financial institution server performing OCR on the check image.

The method can further include sending an account identification number from the mobile device to the server only after receiving a user confirmation from the user in response to the request for confirmation from the user to process the check for remote deposit.

The method can further include, at the mobile device and prior to providing the second OCR data to a financial institution server for validation processing: determining a similarity value between the second OCR data and prior OCR data sent to the server. Providing the second OCR data to the financial institution server for validation processing can occur responsive to the similarity failing to pass a threshold.

In an example, the method further includes prohibiting a user actuation from causing the image capture device to capture the check image unless a usability metric is met. In an example, providing the check image to the financial instruction server with instructions to process the check for remote deposit includes providing both a front check image of a front of the check and a back check image of a back of the check. In an example, the check representation image includes at least one feature indicating that the check representation image is not the check image. In an example, the method further comprises presenting, on the user interface of the mobile device, the OCR data in a list or tabular format. In an example the user actuation is selection by the user of a selectable element on the user interface. In an example, the lacking predetermined check data is missing or is inaccurate. In an example, receiving a check image comprises receiving a check image of a front side of the check and a check image of a back side of the check.

BRIEF DESCRIPTION OF THE DRAWINGS

The following drawings are illustrative of particular embodiments of the present disclosure and therefore do not limit the scope of the present disclosure. Embodiments of the present disclosure will hereinafter be described in conjunction with the drawings, wherein like numerals denote like elements.

FIG. 4d illustrates an example user interface of a remote check deposit system for presenting check data.

DETAILED DESCRIPTION

Figure 1:
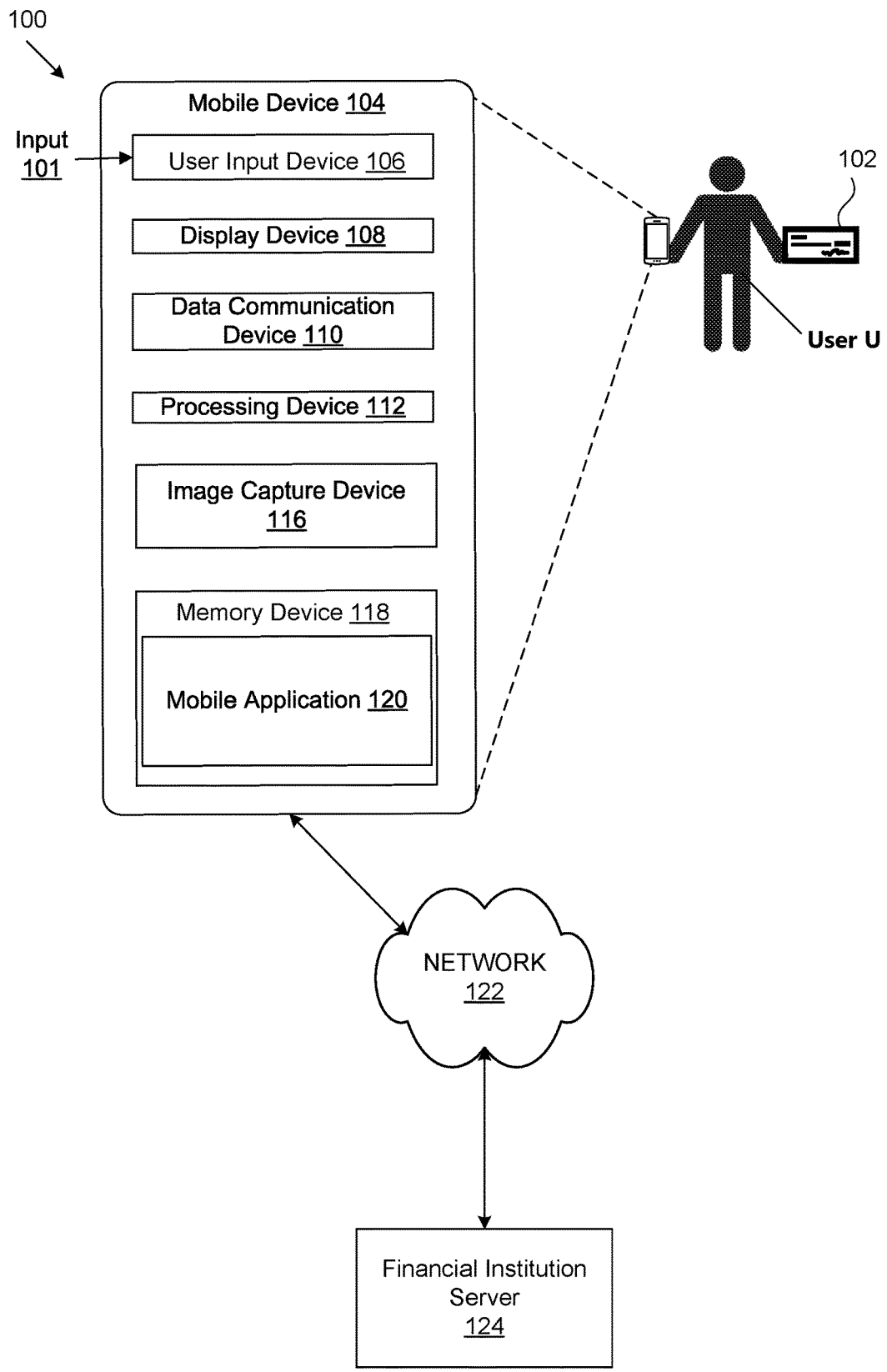
FIG. 1 illustrates a diagram of an example network environment for remote check deposit using a mobile device.

The present disclosure relates to remote check deposit using a mobile device, but a person of skill in the art will recognize how aspects described herein can be applied to other context (e.g., with documents other than checks). The mobile check deposit system and methods described herein include a mobile banking application operating on a mobile device associated with a user. The mobile device is often a personal computing device of a user, such as a smart phone or tablet. An image capture device, such as a camera, on the mobile device is configured to be activated at particular stages in the execution of the mobile banking application to capture image(s) of a check. In some embodiments, the mobile banking application, when executed by the mobile device, receives an actuation instruction from the user, which causes the image capture device to capture an image of a check. For simplicity, an image of a check is referred to herein as a check image.

When capturing the check image, in some examples, the user is required to manually actuate capturing of the image, such as by selecting a capture button presented via a graphical user interface of the mobile device or providing a voice command via another input interface of the mobile device (e.g., by uttering an image capture command), rather than using the mobile deposit application to employ automatic image capture mechanisms to automatically capture the check image. That is, rather than using an automatic image capture mechanism to automatically capture the check image when, for example, the check is properly in the frame of the camera and in focus, the embodiments described herein require manual actuation of the image capture device to capture a check image. In response to the manual user actuation, a check image is obtained from the image capture device and, in turn, processed by the mobile banking application. Aspects of the embodiments described herein can implement manual actuation to capture the check image in a manner that provides more control to the user, minimizes user frustration caused by automatic image capture techniques, improves user privacy (e.g., by placing the capture of images in user control by not having an image feed automatically processed), decreases the use of computing resources needed to automatically analyze a camera feed, and reduces disclosure of certain information that is typically communicated over networks when using automatic image capture techniques.

In some embodiments, the captured check image is not presented (e.g., displayed via a user interface of the mobile device) to the user to verify the check image meets any capture requirements. Rather, the check image is verified by the mobile banking application to determine whether the captured image is usable for completing the remote check deposit process. Verifying aspects of the check image on the mobile banking application executed by the mobile device, referred to sometimes simply as local check image verification, can have several advantages over typical check image verification mechanism. For instance, showing the user an image of the check at this stage is relatively unlikely to add additional benefit because the user already took the image thinking that it was sufficient. Further, keeping sensitive financial information, such as check images, on the mobile device until the check is locally verified reduces the risk of data exposure during transmission of an unusable check image to a remote server. This enhances user privacy and reduces the potential for unauthorized access to sensitive data. In addition, processing aspects of the check image locally on the mobile device eliminates the need to send the image to a remote server, which can lead to faster processing times. This is especially beneficial for users in areas with limited or unstable network connectivity. Local image processing allows for some of the check deposit steps to be performed even when the mobile device is offline. Still further, processing the check image on the mobile device enables immediate feedback to users regarding the quality of the image. This feedback can guide users in capturing clearer images, reducing the likelihood of future errors and rejected deposits. Sending images to a remote server can consume significant network bandwidth, especially in cases of multiple users simultaneously submitting check images. Processing locally minimizes this bandwidth usage. Relatedly, by offloading certain image processing to the mobile device, the load on the remote server is reduced. This can contribute to improved server performance, scalability, and response times.

In some embodiments, the mobile banking application causes the mobile device to perform a check image verification process on-device. For simplicity, the check image verification process on-device is also referred to herein as an on-device check image verification process. The on-device check image verification process includes performing optical character recognition (OCR) on the check image locally at the mobile device, and determining whether required check data (e.g., MICR line data, check amount data) is usably obtainable from the check image. The on-device check image verification process further includes verifying that a signature is present on a signature line. In some embodiments, the on-device check image verification process further verifies that the check image meets requirements of the Check 21 Act. By verifying that the check image meets requirements of the Check 21 Act locally at the mobile device, a higher resolution check image is used for verification, as opposed to using a lower resolution TIFF image at a financial institution server to assess Check 21 Act requirements at the financial institution server. Thus, the accuracy and ease at which the check image's compliance with the Check 21 Act is improved by performing aspects of Check 21 verification at the mobile device with the check image rather than at the financial institution server.

The OCR data can be presented to a user on a user interface of the mobile device. In an example implementation, the OCR data is presented to a user by generating a check representation image and displaying the check representation image via the user interface of the mobile device. The check representation image, in some embodiments, is an illustration version of a check (e.g., cartoon-style), rather than the actual check image that was captured. Presenting an illustrated version of a check (which can be referred to as a check representation image) rather than the actual check image is beneficial in situations where the check image is defective. Where the check image is defective, the software on the mobile device may be unable to sufficiently understand the check image to provide feedback regarding the check image. For instance, portions of the check image may be out of frame or too blurry and so cannot be referenced to show lacking check data. In such situations, the user interface of the mobile device can inform the user of the problem. In some examples, feedback regarding the problem is directly shown to the user on the check image (e.g., annotations can be made on or near a displayed check image). In other examples, a check representation image, rather than the image of the check itself, can be used to show the user a clearer representation of the lacking information or the way in which the check image is defective. Further, showing the user what the check image ought to look like can be beneficial in understanding how to improve imaging.

In some instances, the OCR data is presented on the illustrated version of a check even where the software determines that the check image is sufficient. This can be useful to the user understanding how the software perceives the check image. This can give the user confidence in the system. Further, it can help the user identify problems with false negatives, such as where the software has false confidence that the check image is acceptable and its interpretation accurate.

If the check image is determined to be unacceptable, for example, because required check data is lacking (e.g., MICR line data does not include an account number), check data is inaccurate (e.g., the data fails a checksum, has too many digits, or too few digits), the check representation image includes an indicator, such as a circle or highlighting, that indicates a region of the check image that corresponds with the lacking check data that is required to deposit the check. In some embodiments, the mobile banking application, when executed by the mobile device, causes the mobile device to receive input corresponding to the lacking check data, for example, via an input interface of the mobile device, to remediate the lacking check data. In some embodiments, the mobile banking application, when executed by the mobile device, causes the mobile device to prompt a user via the user interface of the mobile device to recapture the check image to obtain a check image that includes the lacking check data.

When an acceptable check image is received by the mobile device, the OCR data is sent to a server associated with a financial institution for a first level of processing. The financial institution server completes a validation process to validate the received OCR data. In some instances, the financial institution server completes a duplication detection process and a fraud detection process. The server can perform other processes, such as validating deposit limits and presenting information back to the user. If the OCR data is validated, the financial institution server provides a notification to the mobile device indicating that the OCR data from the check image is valid to complete the remote check deposit process. In response to receiving a notification that the OCR data has been validated at the mobile device, a confirmation request is presented on the user interface for confirmation to process the check for remote deposit. Upon receiving confirmation to process the check for remote deposit, the captured check image is sent to the financial institution server to complete the remote check deposit. After the deposit is complete, the mobile device receives a deposit receipt notification.

Example Environment

FIG. 1 illustrates a diagram of an example environment 100 for remote check deposit using a mobile device 104. In some embodiments, user U has a check 102 to deposit remotely into a bank account associated with a financial institution via mobile check deposit processing using the mobile device 104. The mobile device 104 includes a user input device 106, a display device 108, a data communication device 110, a processing device 112, an image capture device 116, and a memory device 118. Aspects of the remote check deposit process are performed locally at the mobile device 104 via the mobile application 120, and aspects of the remote check deposit process are performed at the financial institution server 124. In some embodiments, the mobile application 120 executed on the mobile device 104 is in communication with the financial institution server 124 over network 122 throughout the remote check deposit process. In some embodiments, the mobile application 120 executed on the mobile device 104 is in communication with the financial institution server 124 over network 122 at certain stages of the remote check deposit process. While the mobile device 104, network 122, and financial institution server 124 are briefly described in this section, in addition or instead they may also include aspects described below in relation to the computing system of FIG. 16.

A user input device 106 of mobile device 104 operates to receive a user input from a user for controlling the mobile device 104. The user input can include a manual input and/or a voice input. In some embodiments, the user input device 106 includes one or more buttons, keys, touch levers, switches, and/or other mechanical input devices for receiving the input 101. The user input device 106 can include a touch screen or a gesture input device. In some embodiments, the user input device 106 can detect sounds including the voice input such as a voice of a user (e.g., an utterance) for controlling aspects of a remote check deposit process via the mobile device 104.

In some embodiments, a display device 108 is provided that operates to display a graphical user interface that displays information for interacting with the mobile device 104. Examples of such information include check data information, notifications, and other information. In some embodiments, the display device 108 is configured as a touch sensitive display and includes the user input device

106 for receiving the input 101 from a selector (e.g., a finger, stylus etc.) controlled by the user U. In some embodiments, therefore, the display device 108 operates as both a display device and a user input device.

The data communication device 110 operates to enable the mobile device 104 to communicate with one or more computing devices over one or more networks, such as the network 122. For example, the data communication device 110 is configured to communicate with the financial institution server 124 and receive notifications from the financial institution server 124 at least partially via the network 122. The data communication device 110 can be a network interface of various types which connects the mobile device 104 to the network 122.

The processing device 112, in some embodiments, comprises one or more central processing units (CPU). In other embodiments, the processing device 112 additionally or alternatively includes one or more digital signal processors, graphical processing units (GPUs), field-programmable gate arrays, or other electronic circuits.

The image capture device 116, in some embodiments, is one or more cameras integrated with the mobile device 104. The image capture device 116 is configured to capture an image or images of the check 102. When the image capture device is activated, user actuation is required to capture the check image rather than permitting automatic image capture techniques that capture an image automatically without requiring any manually input by the user U. Check images captured by the image capture device 116 are stored in the memory device 118 and received by the mobile application 120 executed on the mobile device 104 for remote deposit of the check 102.

The memory device 118 typically includes at least some form of non-transitory computer-readable media. Non-transitory computer-readable media includes any available media that can be accessed by the mobile device 104, such as volatile and nonvolatile, removable and non-removable media implemented in any device configured to store information such as computer readable instructions, data structures, program modules, or other data. Memory device 118 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the mobile device 104 in a non-transitory manner.

The memory device 118 operates to store data and instructions. In some embodiments, the memory device 118 stores instructions for a mobile application 120. In some embodiments, the mobile application 120 is a mobile banking application hosted by a financial institution. In some examples, one or more methods described herein can be implemented as instructions stored in one or more memory devices on one or more computers that, when executed by one or more processors, cause the processors to perform one or more operations described herein.

In some examples, as described herein, network 122 includes a computer network, an enterprise intranet, the Internet, a LAN, a Wide Area Network (WAN), wireless transmission mediums, wired transmission mediums, other networks, and combinations thereof. Although network 122 is shown as a single network in FIG. 1, this is shown as an example and the various communications described herein can occur over the same network or a number of different networks.

Figure 2:
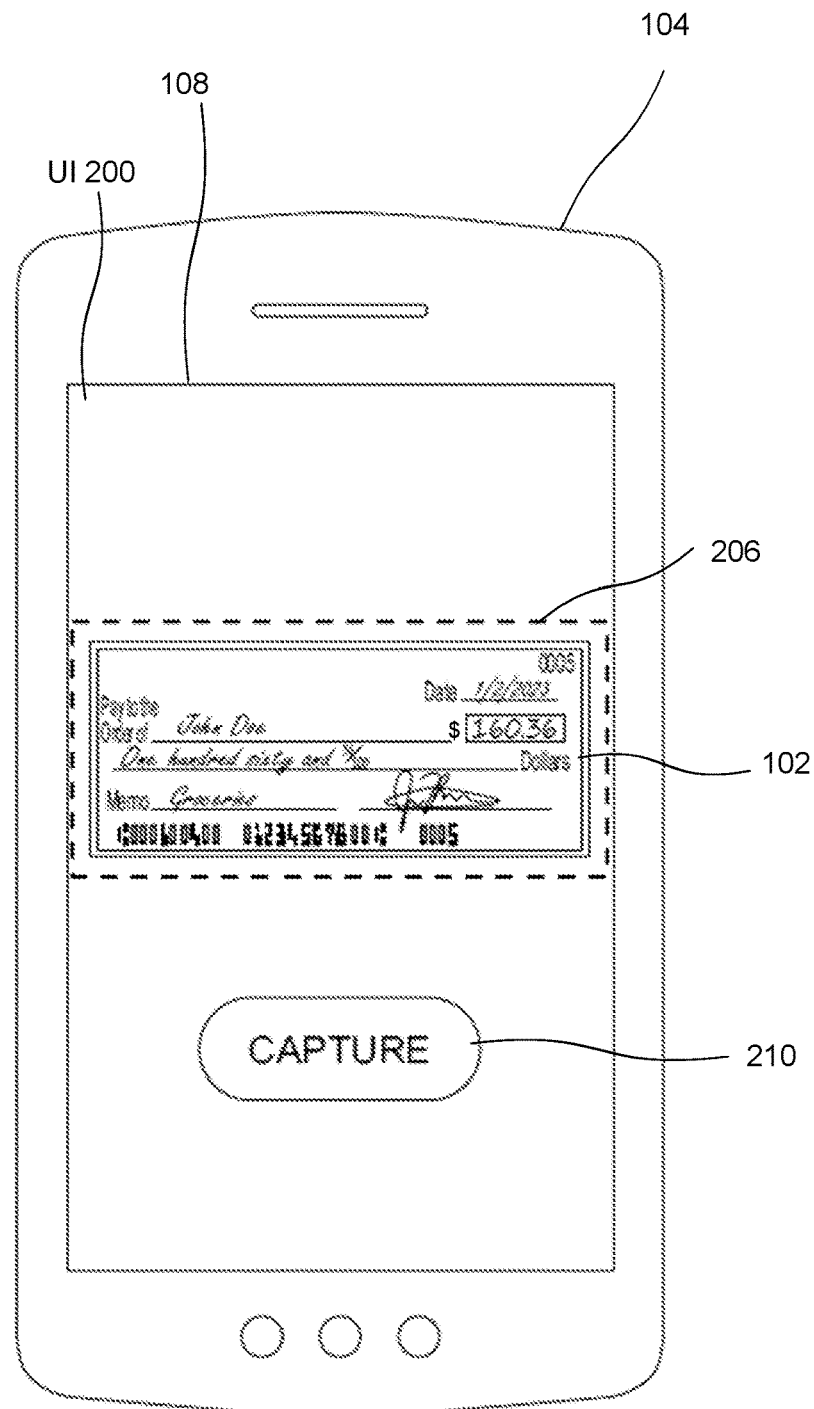
FIG. 2 illustrates an example user interface of a remote check deposit system for capturing a check image.

FIG. 2 illustrates an example user interface 200 of a remote check deposit system for capturing a check image. A display device 108 of mobile device 104 operates to display the user interface 200. One or more image capture devices operating on mobile device 104 capture one or more images of a check 102 for remote deposit.

In some embodiments, the image capture device is activated to capture a check image without specifying any camera settings for the image capture device, and default settings of the image capture device are used to capture the check image. In some embodiments, specific settings of the image capture device (e.g., brightness, zoom) are enabled when the image capture device is activated. In some embodiments, guidance is provided to aid in capturing the check image. For example, automatic edge detection techniques can be used to determine boundaries of the check or regions therein. In some embodiments, a visible alignment guide 206 is presented on the user interface 200 such that the check 102 is aligned within the visible alignment guides 206 and user actuation is received to capture the check image once the check 102 is aligned within the visible alignment guide 206. Visible alignment guides 206 can remain static or can be adjusted to the boundaries of the check as the image capture device is moved in relation to the check 102.

In some examples, the user interface 200 displays a live preview of what will be captured when the capture button is pressed but also includes annotations over the live preview. The annotations can include feedback on whether the image as-is would be acceptable (e.g., using a same or similar process described below in method 300). In some examples, in addition to classification of the check, a machine learning model can then perform object detection and object segmentation on the frame of the video or live preview. The object detection can then be used to identify aspects of the front of the check and the back of the check. Further processing of the check objects is also possible; the processing could include handwriting recognition, OCR, other processing, or combinations thereof. The front of the check can then reveal information, such as date, payee name, payor name and address, the amount, check number, financial establishment associated with the check, whether the check is signed, and whether the check is endorsed. In some embodiments this information can then be digitally superimposed in typed text at the correct location (e.g., the amount and date can be shown at appropriate location on the check). An endorsement can be digitally superimposed on the back of the check if an endorsement is lacking. In other embodiments, a separate check sample can be shown to the user for confirmation of capturing the correct content.

To capture the check image, user actuation can be required. In some examples, user actuation is the selection of a capture button 210 presented on the user interface 200 causing the image capture device to capture the check image. In other examples, user actuation is the selection of a physical button on the mobile device 104 itself causing the image capture device to capture the check image (e.g., a volume button of the mobile device 104). Check images may be captured of the front side of the check and the back side of the check. Once a check image or images are captured, the check image(s) are received by the mobile application executed on the mobile device 104 for remote deposit of the check.

In some examples, user actuation is required but actuation of the capture button 210 is prevented until a process determines that the image to be taken will be sufficiently usable. For instance, the capture button 210 is unavailable (e.g., locked or grayed out) unless a usability metric is higher than a predetermined threshold. The usability metric can be correlated with how well the check can be used for further processing. The usability metric can be determined based on the angle of skew of the check object, the amount of light on the object (e.g., too dark or very bright), the amount of contrast, the quality of the check image itself, other characteristics, or combinations thereof. In some instances, the capture button 210 is prevented from being actuated until required check data is present and detectable in the live preview.

In an example, the check image is obtained using a document mosaicking technique. Document mosaicking is a traditional technique in which multiple frames are combined to form a composite image that uses information from the multiple frames to form a more suitable image (e.g., in terms of area covered, image resolution, sharpness, or other factors) than before. Example implementations include image stitching techniques, such as those provided by the OPENCV library. In some examples, the actuation of the capture button 210 causes the mobile device 104 to take the multiple frames, apply mosaicking, and produce a final check image as a result. In other examples, while the user interface 200 is active, the camera continuously obtains and discards images until the capture button 210 is actuated and then previous x frames are retained as well as future y frames are obtained. The x and y frames can then serve as the multiple frames for use with mosaicking. In addition or instead, a frame is captured in response to the user actuating the capture button 210, and then n frames before and after the capture button being actuated are used to enhance the image captured in response to the user selecting the capture button 210.

Figure 3A:
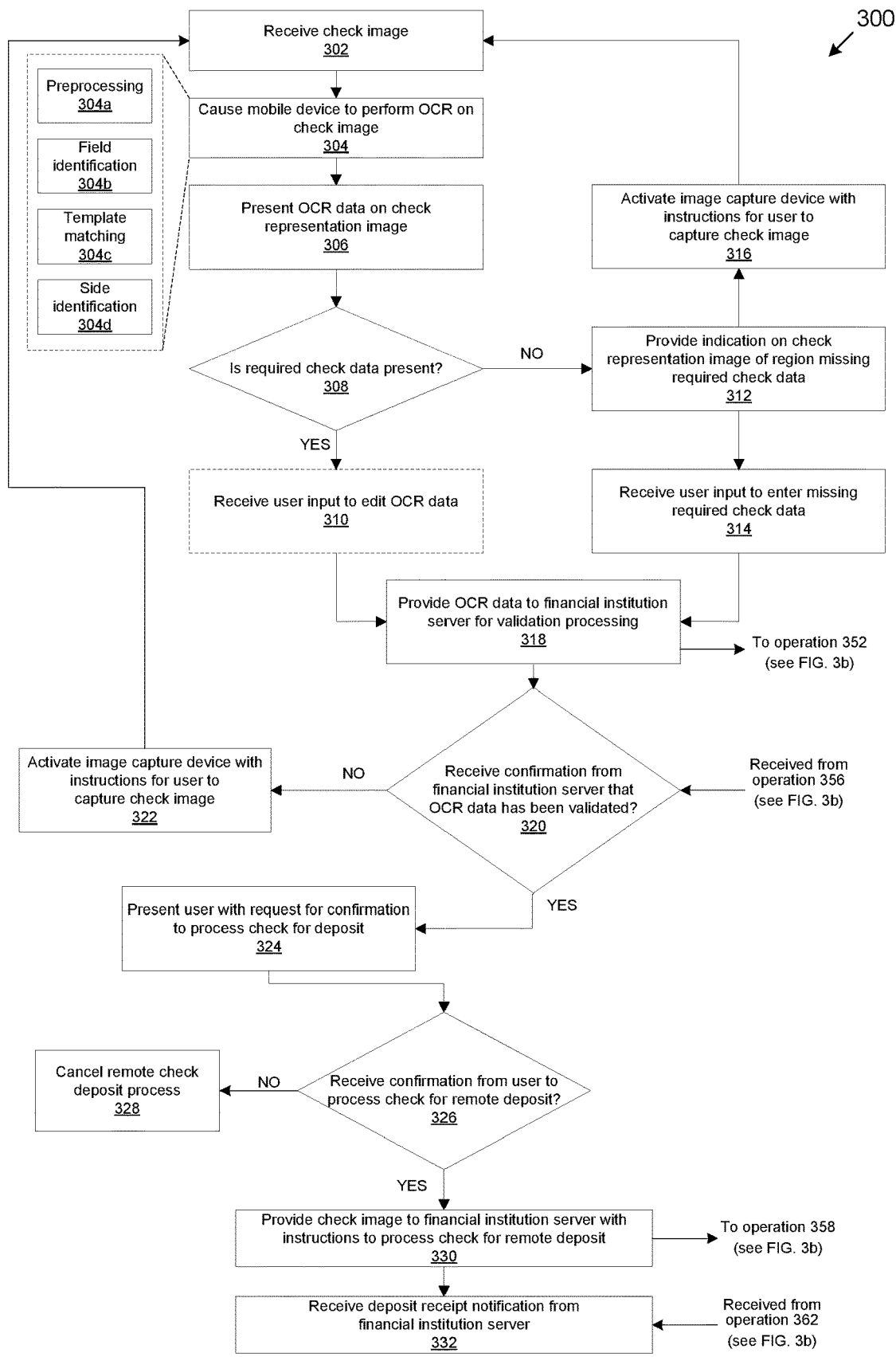
FIG. 3a illustrates an example flowchart of a method for remote check deposit using a mobile device.
Figure 3B:
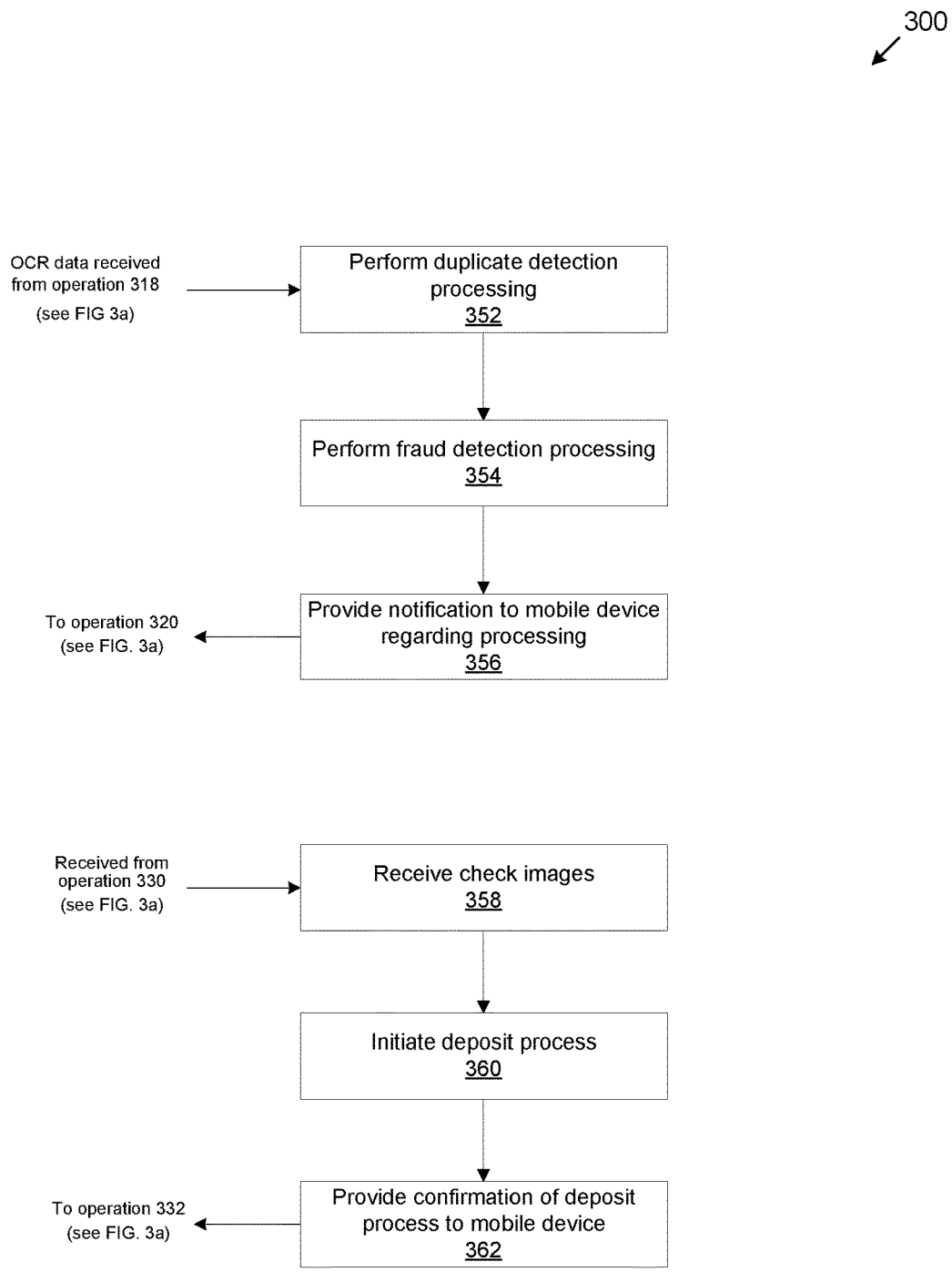
FIG. 3b illustrates an example flowchart of a method for remote check deposit using a mobile device.

FIGS. 3a and 3b illustrates an example flowchart of a method 300 for remote check deposit using a mobile device 104. The operations within FIG. 3a occur at the mobile device 104, and the operations within FIG. 3b occur at a financial institution server. In an example, the mobile device 104 activates a mobile application 120 for mobile check deposit in response to receiving user input. The mobile application 120 may be, for example, a dedicated application for depositing checks, a full featured banking application, another kind of application, or combinations thereof. The method 300 for remote check deposit can begin with operation 302.

Operation 302 includes a mobile application 120 operating on the mobile device 104 receiving a check image captured by an image capture device 116 of the mobile device 104. For instance, the check image can be received in response to receiving a user actuation causing the image capture device 116 to capture the check image. In some embodiments, the check image is captured in response to a user selecting a selectable element (e.g., capture button 210) presented on a user interface 200 of the mobile device 104 as described above with reference to FIG. 2. The check image can but need not be captured automatically using automatic image capture techniques. In some examples, the mobile application 120 executed on the mobile device 104 receives a check image of the front of the check 102 and a check image of the back of the check 102. In some examples, a single actuation of the capture button 210 causes multiple check images to be obtained. In some instances, the images can be obtained with different settings (e.g., from different cameras or with different aperture or shutter speed settings). The obtaining an image can include using all of these images or selecting a subset of these images that meet a selection criteria (e.g., having a usability score higher than a threshold). Many mobile devices 104 include operating systems with application programming interfaces that facilitate capturing images. For instance, on IOS and macOS, the AVCaptureSession class is used for media capture. Following operation 302, the flow of the method 300 can move to operation 304.

At operation 304, the mobile application 120 executed on the mobile device 104 causes the mobile device 104 to perform OCR on the check image. The mobile application includes an OCR engine configured to extract text from the check image and recognize characters of the extracted text to generate OCR data. The OCR engine can take any of a variety of forms. OCR and in particular handwriting recognition is a relatively popular area of research and many different people and organizations have proposed solutions. In some instances, the mobile device 104 causes OCR to be performed by a software OCR process hosted by a third party (e.g., via AMAZON TEXTRACT, GOOGLE CLOUD VISION API, MICROSOFT AZURE AI SERVICES), a manual OCR process hosted by a third party or locally (e.g., the user of the mobile device 104 is asked to manually enter all characters in the image), or using a library stored and run locally. In an example, OPENCV can be used to recognize characters. In some examples, there is a machine learning framework trained to receive an image (e.g., part or all of the check image) and provide recognized characters as output.

In an example, the OCR implementation includes one or more aspects of US 2022/0319216, which was filed as U.S. patent application Ser. No. 17/569,121 on Jan. 5, 2022, and which is hereby incorporated herein by reference in its entirety for any and all purposes. That application describes performing geometric extraction on a document (e.g., a check) by recognizing text blocks of the unstructured document, generating bounding boxes that surround and correspond to the textual blocks, determining search paths having coordinates of two endpoints and connecting at least two bounding boxes, and generating a graph representation of the at least a portion of the page, the graph representation including the plurality of textual blocks, the coordinates of the vertices of each bounding box and the coordinates of the two endpoints of each search path.

In some instances, the OCR engine is specifically configured for (e.g., trained for) use on check data. A general purpose OCR engine may be configured with a very wide vocabulary of potential words, but that may create issues for processing check data. For example, an entry in a date field could be "MAR 10", which a general purpose OCR engine may plausibly (but incorrectly) interpret as "MARIO", which would not make sense in the context of a date field on a check image. Rather, the OCR engine applied to the date field may be configured to favor outputting dates. As an example, an OCR engine may be configured to produce the n highest confidence outputs and then select the highest confidence one that is a date. As another example, there may be a separate OCR engine trained on the date fields to more accurately interpret what is written in that field. Similar configurations may be used for other fields on the check image.

Depending on the implementation, the operation 304 can include one or more sub-steps or functions, such as a preprocessing operation 304a, a field identification operation 304b, a template matching operation 304c, a side identification operation 304d, other steps, or combinations thereof.

In the preprocessing operation 304a, one or more preprocessing techniques can be applied to the check image. Such preprocessing techniques can improve the reliability, consistency, or results of the following steps.

Example preprocessing includes identifying check boundaries relative to the remainder of the check image. This can be performed using any of a variety of techniques such as edge detection (e.g., as implemented in OPENCV) and then setting the boundaries of the check within the check image to a polygon that has an expected check aspect ratio. This can be performed or enhanced by using color, contrast, brightness or other kinds of identification. For instance, a check may have different visual characteristics compared to a table on which it is resting when the picture is taken. Such visual characteristics can be used to identify the check within the image. In another example, the boundaries can be determined by identifying the corners of the check and then connecting the corners with lines to form the boundaries.

Further example preprocessing includes normalizing the check within the image. This normalization processing can include normalizing the position or proportions of the check by, for example, skewing, deskewing, rotating, scaling, stretching, moving, or applying other transformations to the check within the check image to bring the check closer to an expected or standard format on which other steps may depend. This can include cropping the image so substantially only the check is within the check image. The normalizing can be based on the check boundaries identified above. This can also include normalizing the check to have a predetermined aspect ratio. Normalizing the check within the check image can further include adjusting image quality of the check image, such as modifying brightness, contrast, levels, sharpness, or other modifications.

In still further examples, preprocessing can include removing backgrounds from the check image. If the check was placed on a table or surface by the user to capture the check image, the background containing the table or surface can be removed, blurred, filled, or otherwise modified. The brightness of the check image can also be adjusted to obtain an improved image brightness for performing OCR on the check image. Defects detected in the check image can be removed.

Preprocessing can include saving multiple versions of the check image at the mobile device 104. For instance, an original color image can be stored in addition to a bi-tonal TIFF (Tag Image File Format) formatted image. Thus, the mobile application can include a TIFF image generation module configured to convert the original color check image into a grayscale TIFF image. The color image can be saved in a specified format, such as TIFF, JPEG (Joint Photographic Experts Group), PNG (Portable Network Graphics), PDF (Portable Document Format), or another format.

In the field identification operation 304b, the OCR engine or another engine analyzes regions within the check image to identify check data fields such that the generated OCR data includes an indication of check fields and data associated with each check field. For example, the engine is configured to recognize a region of the check as an amount box, so the engine can determine that the text within that region corresponds with the check amount. In another example, expected fields can be used to determine which side of a check is depicted in the image (see preprocessing operation 304a, above). In a further example, whether all expected fields can be identified can be used to determine whether the required check data is present. Example front check image expected fields can include a payor information field, a payee name field, a check number field, a date field, a check amount in words field, a memo field, and a MICR line data field (e.g., including a routing number field, an account number field, and a check number field). Example back check image expected fields can include an endorsement field. These fields can be identified using various techniques including OCR. For instance, a field can be identified and a bounding box can be drawn around the field. The bounding box can then be used as a region in which OCR will be performed to determine a value associated with that field. Because identifiers or labels of these fields are often typed, they may be more reliably identified than handwritten areas of a check image. In some examples, the fields can be identified using known check templates, such as described below in template matching operation 304c.

In the template matching operation 304c, known check templates are used to determine regions on a check image where check data is be expected. For instance, because many checks may have similar formats (e.g., the relative positioning of fields and other content) that can be predetermined and labeled (e.g., manually or with an automated process), identifying that the check image contains an image of a check having a predetermined pattern can be used to identify or know that expected fields are present (e.g., because otherwise the template would not match). The check image can be compared to the known check templates to determine a format that the check follows. When a match is found between a known check template and the check image, the matching known check template can be used during the OCR process to correlate the extracted text with the corresponding check field based on the location of the extracted text on the check. This improves the accuracy of the OCR process to generate OCR check data. If there is no known check template that matches the check image, this might be used as an indication that the check image is defective and there is a problem with the check image. If there is no known check template that matches the check image, in some embodiments, the image capture device is activated with instructions for the user to capture another check image. In an example implementation, a template matching function can be used (e.g., the cv.matchTemplate( ) function from OPENCV) to determine the location and position of a known check template (e.g., the check template can be samples of known check design patterns) within the check image to determine which template the check follows. If none matches, then the application can infer that the image is bad). If there is a match, then the application can take known positions of check elements from the template (e.g., bounding boxes of where that data is expected to be) and then perform OCR or other recognition of the data within that region to increase accuracy of the OCR process.

In the side identification operation 304d, the check image can be analyzed to determine whether the check image depicts the front or the back of the check. In some examples, the output of prior steps can be used for this determination, such as whether the image include fields associated with the front or back or whether the image matches a template of a front of a check or a back of a check (e.g., if the check image contains an endorsement field, then it is considered the back of the check and if the check image contains a memo field, then it is considered the front of the check). In one example implementation, a machine learning model is trained to determine whether an image is of a front of a check or a back of the check.

Following operation 304, the flow of the method 300 can move to operation 306.

At operation 306, OCR data generated from the check image is presented on the user interface of the mobile device 104. In some embodiments, the presented OCR data includes one or more of a check amount, a date, a payee name, an account number, a routing number, and a check number. In some embodiments, the OCR data is presented on a check representation image, wherein the check representation image is an illustration representing the check image (e.g., cartoon-style) and not the check image itself. The check representation image can include standard check fields (e.g., payee line, date field, amount box, MICR line), and the OCR data is displayed in the appropriate corresponding location on the check representation image. For example, if the OCR data includes a check amount of $100.00, then "100.00" is displayed in the amount box on the check representation image. Presenting the OCR data on the check representation image (operation 306) is described in more detail below with respect to FIG. 4a.

Continuing operation 306, in examples, the OCR data is presented on the user interface of the mobile device 104 in a tabular or list format in addition or instead of the check representation image. An example tabular or list format is described in more detail with respect to FIG. 5a and FIG. 5b, below.

Following operation 306, the flow of the method 300 can move to operation 308.

At operation 308, on-device check image verification processing occurs at the mobile device 104. For example, the check image verification processing can verify that the OCR data generated from the check includes required check data needed to process the check for remote deposit (operation 308). In order to process a check for deposit, certain information must be obtained from the check so that a financial institution can determine, for example, where the funds for deposit are coming from and an amount of funds to deposit. The verification operation 308 can verify whether the OCR data generated from the check image includes required check data to process the check for remote deposit. This can include comparing the generated OCR data to predetermined required check data fields. In some examples, required check data comprises an amount and MICR line data, wherein the MICR line data includes an account number and a routing number, and a check number. In some examples, the verification operation 308 includes determining whether any value is present in one of the fields. For instance, if there is OCR data corresponding to the date field, then it can be determined that the required data for that field is present. In some examples, the operation can include determining not only that such data is present but also determining whether that data is believable. For instance, the mobile application 120 can determine whether the data in those fields contains the correct amount or kind of data (e.g., correct number of digits in a routing number or a plausible date is in the date field). For instance, if the check image is slightly blurry, then the OCR engine may produce OCR data for a field, but the OCR data may not make sense in context or at all (e.g., alphabet characters in the numeric amount field). In addition or instead, the mobile application 120 can determine whether the numeric amount and the written-out amount match. In some embodiments, other required check data can include a payee name and a date. In some embodiments, the verification operation 308 further includes verifying that the check image complies with Check 21 standards based on the generated OCR data.

In some examples, the verification operation 308 on the mobile device 104 includes duplicate detection. For example, at the mobile device and prior to providing the OCR data to the financial institution server 124 for validation processing, the mobile application 120 can determine a similarity value between the second data and prior data sent to the financial institution server 124. For instance, the mobile application 120 can store OCR data of all checks that have been sent to the financial institution server 124. If the mobile application 120 determines that the OCR data is sufficiently similar to previously submitted OCR, then the mobile application 120 can alert the user that this may be a duplicate check. In some examples, the OCR data is only provided to the financial institution server 124 for validation processing responsive to the similarity failing to pass a threshold (e.g., it is not too similar to prior checks so is unlikely to be a duplicate check).

In some examples, the verification operation 308 can be performed using a trained machine learning model. For instance, the machine learning model can be trained to verify a check as having proper data or parts thereof for processing. The check image or portions thereof can be provided to the machine learning model and the output of which can be used for verification. The machine learning model can be local to or remote from the mobile device 104.

In some embodiments, at operation 308, the mobile device 104 performs additional on-device check image verification processing. For example, the mobile device 104 can use visual recognition techniques to determine whether a signature or endorsement is present on the check image. A signature can be detected if a pixel count is above a predetermined threshold in a region of the check image where a signature line is located. In some examples, machine learning is used to identify the presence or absence of a signature in a specific region of the check image. In some embodiments, an additional verification operation is performed by the mobile device 104 to detect whether an endorsement signature is present on a check image of the back side of the check, If the required check data is not present on the check image, then the method 300 can take the "NO" branch from operation 308 to operation 312.

At operation 312, an indication is presented on the check representation image of a region of the check image that is lacking required check data. For example, if the OCR processing could not determine OCR data for the check amount (e.g., because the check image was blurry around the check amount), so no check amount is included in the generated OCR data, then the check amount box is circled or highlighted on the check representation image. This provides an indication to the user as to why the check image is not useable to process for remote check deposit. By providing an indication on the user interface of the precise region or regions of the check image that are problematic or lacking required data, the user receives informative feedback to enable remediation of issues with the check image.

In the example user interface 400a shown in FIG. 4a and described below, the OCR data is lacking the check amount in the check amount box 426a. Thus, the mobile application executed on the mobile device 104 determines that the required check data is not present and takes the "NO" branch from operation 308 to operation 312. An indication is then provided on the check representation image of the region lacking the required check data, as described in more detail below with respect to FIGS. 4b-4e.

After an indication is provided on the user interface identifying a region of the check image that is lacking required data at operation 312, the problem with the check image can be remediated. In examples, the problem is remediated by receiving a new check image captured by the image capture device. Thus, following operation 312 the flow of the method can move to operation 316.

At operation 316, the image capture device is activated with instructions for the user to capture another check image. Knowing the problematic region of the original check image, the user can proceed to capture a second check image used to generate OCR data including the required check data that was lacking from the first captured check image.

In some implementations, the flow of the method 300 moves from operation 312 to operation 314.

At operation 314, user input is received that remediates the problem with the check image. In an example, user input is received that edits the OCR data to input the lacking required check data. For example, if an indication was provided on the check representation image that a check amount could not be determined from the check image so the OCR data is lacking the check amount, input can be received via the user interface to input the check amount. In some embodiments, after the lacking required check data has been received, the mobile device 104 repeats the verification operation to verify that the OCR data generated from the check includes required check data needed to process the check for remote deposit (operation 308).

If the required check data is present on the check image, the flow of the method 300 can take the "YES" branch from operation 308 to operation 310.

At operation 310, input may be received via the user interface to edit the OCR data. In some examples, input to edit the OCR data is received to correct a mistake in the OCR data that nonetheless passes the test for whether the required check data is present.

At operation 318, the OCR data is provided to a financial institution server 124 for a first level of validation processing. This can be performed after the OCR data is verified at the mobile device 104 as including required check data. Following operation 318, the flow of the method 300 can move to operation 352, as shown in FIG. 3b, which occurs at the financial institution server 124.

In some embodiments, during the first level of validation processing by the financial institution server 124, the financial institution server 124 does not have the check image at this stage. In some embodiments the financial institution server 124 only has the OCR data. The financial institution server 124 may also include additional metadata regarding the check, such as whether and to what extent the OCR data has been edited by the user (e.g., either to correct the OCR data or to enter missing required check data). The OCR data provided to the financial institution server 124 can be processed along with instructions for manual review of the OCR data if needed. During the first level of validation processing by the financial institution server 124, the authenticity and legitimacy of the check is validated by analyzing the OCR data. For example, the OCR data generated from the MICR line on the check image is validated for accuracy and authenticity to ensure the check is legitimate and corresponds with a legitimate account number and routing number.

At operation 352, shown in FIG. 3b, the financial institution server 124 receives the OCR data and performs processing. In an example, this operation includes performing duplicate detection processing. This can include comparing the OCR data with previously submitted OCR data or the information of previously deposited checks to determine whether the same or substantially the same check has already been deposited. If so, then the process may end (e.g., with an error message being sent to the user) or may continue under modified conditions (e.g., with a flag indicating manual review is necessary before depositing). Before, during, or after operation 352, the method 300 can include operation 354.

At operation 354, shown in FIG. 3b, fraud detection processing can be performed using the OCR data. For instance, the OCR data may be analyzed to determine a confidence that the OCR data is associated with fraud. In some examples, the operation 354 can include providing the OCR data to a machine learning model trained to detect fraud from OCR data. In some examples, fraud detection can determine whether the OCR data is in line or out of line from prior checks from that payee or payor. It can also include determining whether other data about the check indicates a level of fraud. For instance, in addition to the OCR data, the financial institution server 124 may receive other data regarding the check, such as whether and to what extent a check matches a template of a check. This can include what background the check had, what font the check had, other features, or combinations thereof. In some examples, the OCR data includes a vector representation of some data of the check, such as handwriting or signatures. Such data can be compared (e.g., by measuring a distance in vector space) to known true data to determine whether fraud may be present.

In some examples, the fraud detection can include one or more steps or operations described in U.S. patent application Ser. No. 18/052,081, filed Nov. 2, 2022, which is hereby incorporated herein by reference in its entirety for any and all purposes.

In operation 356, shown in FIG. 3b, following the duplicate detection and fraud detection processing the financial institution server 124 sends a notification back to the mobile device 104 regarding the processing. The notification can include information regarding the relative success or failure of the processing. In some examples, prior to sending the notification, other processing can be performed by the financial institution server 124. Such processing can include determining whether processing the check would violate rules or protocols, such as whether depositing the check would result in violating deposit limits.

Returning to FIG. 3a, if the financial institution server 124 is not able to validate the OCR data to confirm the accuracy and authenticity of the OCR data (e.g., taking the "NO" branch from operation 320 to operation 322), this is indicative of a problem with the OCR data, which, in examples, is caused by a problem with the check image. Thus, in examples, the image capture device on the mobile device 104 is activated with instructions for the user to capture another check image (operation 322).

If the financial institution server 124 is able to validate the OCR data to confirm the accuracy and authenticity of the OCR data, a confirmation is received by the mobile device 104 from the financial institution confirming that the OCR data has been validated. If a confirmation is received that the OCR data has been validated by the financial institution server 124, then the "YES" branch can be taken from operation 320 to operation 324.

In operation 324, a request for confirmation to process the check for deposit is presented on the user interface of the mobile device 104. In some embodiments, the request for confirmation presented on the user interface includes presenting a selectable element on the user interface that, if selected by the user, indicates that a confirmation has been received from the user to process the check for deposit. Following operation 324, the flow of the method 300 can move to operation 326.

If no confirmation from the user is received by the mobile device 104 to process the check for remote deposit or there is an explicit cancelation by the user, then the flow of the method 300 can take the "NO" branch from operation 326 to operation 328.

In operation 328, in some embodiments, the remote check deposit is canceled. In some instances, this can include sending a notification to the financial institution server 124 that the remote deposit is canceled.

If confirmation is received by the mobile device 104 to process the check for remote deposit, then the flow of the method 300 can take the "YES" branch from operation 326 to operation 330.

In operation 330, the mobile device 104 sends the check image to the financial institution server 124 with instructions to process the check for remote deposit. In some implementations, prior to operation 330, the financial institution server 124 has not received the check image. Thus, in some embodiments, the check image is sent from the mobile device 104 to the financial institution server 124 in a separate communication file from the file that sent the OCR data to the financial institution server 124. Following operation 330, the flow of the method can move to operation 358, as shown in FIG. 3b, which occurs at the financial institution server 124.

At operation 358, shown in FIG. 3b, the financial institution server 124 receives the check images from the mobile device 104. The flow of the method 300 can move from operation 358 to operation 360. In examples, before receiving confirmation at the mobile device 104 to process the check for remote deposit, an account identification number associated with the check is not provided to the financial institution server 124. Rather, account labels or aliases are used, in some examples, for account identification prior to receiving confirmation from the user to process the check for remote deposit.

At operation 360, shown in FIG. 3b, the financial institution server 124 initiates the deposit process, such as by performing a traditional mobile check deposit process. In some examples, this operation can include performing additional verification on the check image and the OCR data, such as additional fraud detection verification. This additional processing can include analyzing handwriting, ink color, date style, signature, endorsement signature, etc. to detect if the check was modified after it was drafted by the payor. After additional verification of the check image and OCR data by the financial institution server 124, a memo is posted on the user's account showing the check deposit amount. The financial institution server 124 then writes a log record of the check to capture the details of check being processed for remote check deposit. The flow of the method 300 can move to operation 362.

At operation 362, shown in FIG. 3b, the financial institution server 124 sends a notification to the mobile device 104 confirming the deposit process. This confirmation can be a confirmation that the deposit process has started or is completed. Following operation 362 the flow of the method can return to the mobile device 104 as operation 332, as shown in FIG. 3a.

Returning to FIG. 3a, at operation 332, the mobile device 104 receives the confirmation from the financial institution server 124. In an example, the financial institution server 124 has completed the remote check deposit process and the confirmation indicates as much. In some embodiments, the deposit receipt notification is a push notification presented on the user interface of the mobile device 104. Upon completion of the remote check deposit process, funds will appear in the user's account. Funds may not appear in the user's account immediately, and may take a few days to become available to the user.

Figure 4A:
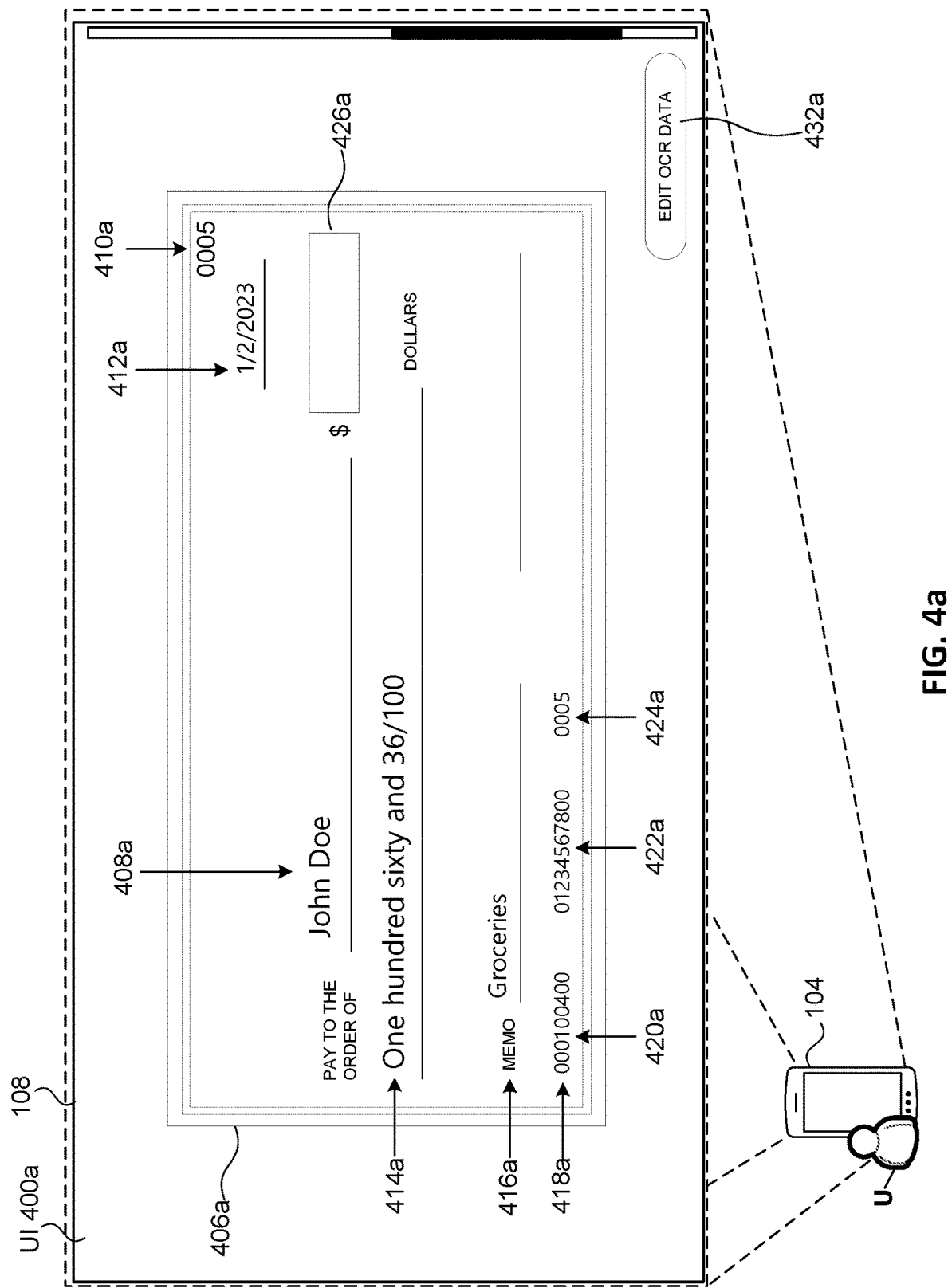
FIG. 4a illustrates an example user interface of a remote check deposit system for presenting check data.

FIG. 4a illustrates an example user interface 400a of a remote check deposit system for presenting check data. The user interface 400a is an example of the user interface on which the OCR data is presented in operation 306 of method 300 described above with reference to FIG. 3a. User interface 400a is presented on a display device 108 of a mobile device 104 associated with a user U. In some examples, after a captured check image has been received and the mobile application has caused the mobile device 104 to perform OCR on the check image, the OCR data is presented on a check representation image 406a and presented on the user interface 400a.

The check representation image 406a is not the actual check image or directly derived from the check image (e.g., arrived at by modifying pixels of the check image until the check representation image 406a is achieved), rather, the check representation image 406a can be an illustration or "cartoon-style" representation of a check. In some examples, the check representation image 406a is a photograph of another check (i.e., not the check 102). The representation image 406 can be ersatz or a simulacrum of the check 102. For instance, the check representation image 406a can violate one or more standards of check appearance (e.g., ANSI standards for checks), such as by having a non-standard aspect ratio or by replacing MICR fonts with non-MICR fonts. One or more MICR symbols (e.g., transit, on-us, amount, and dash symbols) can be omitted or replaced with non-MICR symbols. The check representation image 406a can include watermarks, words, or other features that convey that the check representation image 406a is not a real check. The check representation image 406a can include one or more watermarks, words, or other features that convey that the check representation image 406a is not a receipt, is not the check image, it not an indication that the check 102 was successfully deposited, and is not meant as a substitute for the check 102 for any purpose other than facilitating the mobile check deposit workflow. While the above has been described in the context of such indications being displayed on the check representation image 406a, they may instead or in addition be provided elsewhere on the user interface displaying the check representation image 406a.

In some instances, the check representation image 406a can be selected from among multiple different check representation images 406a or templates for creating the check representation image 406a. For instance, a check representation image 406a can be selected from among multiple check representation templates, such as to increase or decrease a similarity between the check representation image 406a and the check image. In certain instances, the check representation image 406a can be made to appear very different from or very similar to the check image (e.g., different layout, color, symbols, formatting, etc.) depending on user or system preferences. In some examples, the differences from the check image can be increased or decreased depending on how much information is correctly available (e.g., how close the check image is to meeting requirements). For instance, the check representation image 406a can be in black and white or grayscale if one or more requirements are not met and then in color once all requirements are met. In some examples, an average or other representative color can be determined from the check image (e.g., the entire image or the check portion thereof) and then used as a background or primary color of the representation image. In another example, an opposite or contrasting color can be used.

In some instances, the check representation image 406a can be created by compositing the check image with a check representation template. For instance, one or more regions (e.g., the date region) of the check image can be extracted from then check image and superimposed over the template. Such superimposition can be such that the composite image is representative of not only what the content was on the check image but also how the content in the check image appeared (e.g., as influenced by handwriting, font, ink color, number formatting, date formatting, position, other contributors to appearance, or combinations thereof).

In other instances, the check representation image 406a lacks stylistic content from the check image. Such a check representation image 406a can be representative of what the substantive content was on the check image but not how the content in the check image appeared. In other words, given a check representation image 406a that lacks stylistic content from the check, one would be expected to pick the original check image from images of checks having the same substantive content (e.g., date, amount, memo, etc.) but written by different people (e.g., thereby having different stylistic content such as handwriting and other factors contributing to appearance) at a rate no better than random chance.

In still other instances, the check representation image 406a can preserve stylistic content without directly importing stylistic elements from the check image. For instance, elements created for the check representation image 406a can be constructed with stylistic elements (e.g., font, color, scaling, position, etc.) selected based on a similarity to stylistic elements of the check image. As described in more detail below, such techniques can include selecting a font based on handwriting in the check image, selecting a color based on ink in the check image, selecting element scale/position based, other techniques, or combinations thereof.

Preserving stylistic content without directly importing stylistic elements from the check image can include selecting a font based on handwriting within the check image. For instance, at least some of the OCR data (e.g., a date) can be rendered in several different fonts and then one font can be selected that is most similar to the handwriting in the check image. A machine learning algorithm can be used to determine similarity (e.g., a machine learning model trained to determine similarities between fonts). In addition or instead, similarity can be determined by overlaying each of the rendered fonts over the original and selecting the one that has the most pixels in common. In addition or instead, the renderings and the handwriting can be embedded into a vector space and the rendered font that has the least distance from the handwriting can be selected.

Preserving stylistic content without directly importing stylistic elements from the check image can include selecting a color based on an ink in the check image. For instance, the color can be an average color within a region or at a point believed to be within a handwritten ink line. In addition to or instead of ink color used in handwriting the check, the ink color can be the color of ink used to print the background, text, or other features on the check.

Preserving stylistic content without directly importing stylistic elements from the check image can include selecting a scale and/or position of an element in the check representation based on a scale of a corresponding element in the check image. In an example, scale and position can be determined by identifying locations of regions of handwritten content and then scaling and/or positioning the generated content to approximate the regions. For instance, bounding boxes can be created to encompass a field in the check image and corresponding content in the representation image template can be scaled and positioned (including rotated) to more closely align with the bounding box identified in the check image.

For instance, where the check has cursive handwriting in blue ink, stylistic elements can be selected to mimic that handwriting, such as by selecting a specific script font from among multiple font choices based on a similarity to the handwriting or selecting a font color configured to match the ink color of the pen used in the check.

The OCR data generated from the check image is superimposed on or integrated with the check representation image 406a in the appropriate check field location (e.g., OCR data for a check amount is presented in a check amount box on the check representation image). For instance, the content can be placed within a bounding box of a corresponding field (e.g., date content is put in a date bounding box located relative to the date field). In some embodiments, the OCR data includes a payee name 408a, a check number 410a, a date 412a, a check amount in words 414a, a memo 416a, MICR line data 418a including a routing number 420a, an account number 422a, and a check number 424a, and a check amount in a check amount box 426a.

In some embodiments, the user interface 400a further includes a selectable element 432a configured to receive user input to edit the OCR data. In examples, the user interface 400a is configured such that the display device 108 is a touch screen and if user U selects (e.g., taps, touches) OCR data displayed on the user interface 400a, the user U is able to edit the OCR data. For example, if user U reviews the OCR data displayed on the user interface 400a and sees that the OCR data includes a mistake (e.g., OCR data does not match text on check), in some embodiments, input will be received via the user interface to edit the OCR data. Edits to the OCR data, in some examples, can include edits to the spelling of the payee's name or editing the check amount if the OCR data does not match what was written on the check. The edits can appear live on the check representation image.

In some instances, the user input can be compared with the OCR data and determine a relative similarity or difference. For instance, the difference can be determined based on a string metric (e.g., Levenshtein distance or another string metric). If the difference is larger than a threshold, then the system may provide an alert indicating that the correction is meant for correcting OCR errors rather than errors in writing the actual check (in other words errors in the system understanding what is written on the check rather than correcting what should be written on the check instead). In another example, the OCR process can provide an output of the most likely correct answers and it can be determined whether the proposed correction is a top N most likely correct answer. If so, then the correction may be permitted otherwise the correction may be flagged or prohibited.

In some instances, the user input is prohibited from being received when information is lacking. For example, if the OCR data lacks date data, then it may be because the check image was inadequate (e.g., the date field was cut off), rather than from an error in the OCR process. So to solve the problem, the user may be required to recapture the check image rather than manually specify the information. In certain examples, the system may permit the receipt of input even if the data lacking for certain fields, such as the memo field or endorsement field.

In some instances, the mobile application 120 requests user input to resolve conflicts or uncertainties. For instance, the mobile application 120 can compare the OCR data for the written out dollar amount and the numerical dollar amount and determine that the two amounts are different (and they should be the same). The mobile application 120 can then present the two OCR data values and ask the user to choose which one is correct. In addition or instead, the mobile application 120 can have the user specify the correct amount.

Figure 4B:
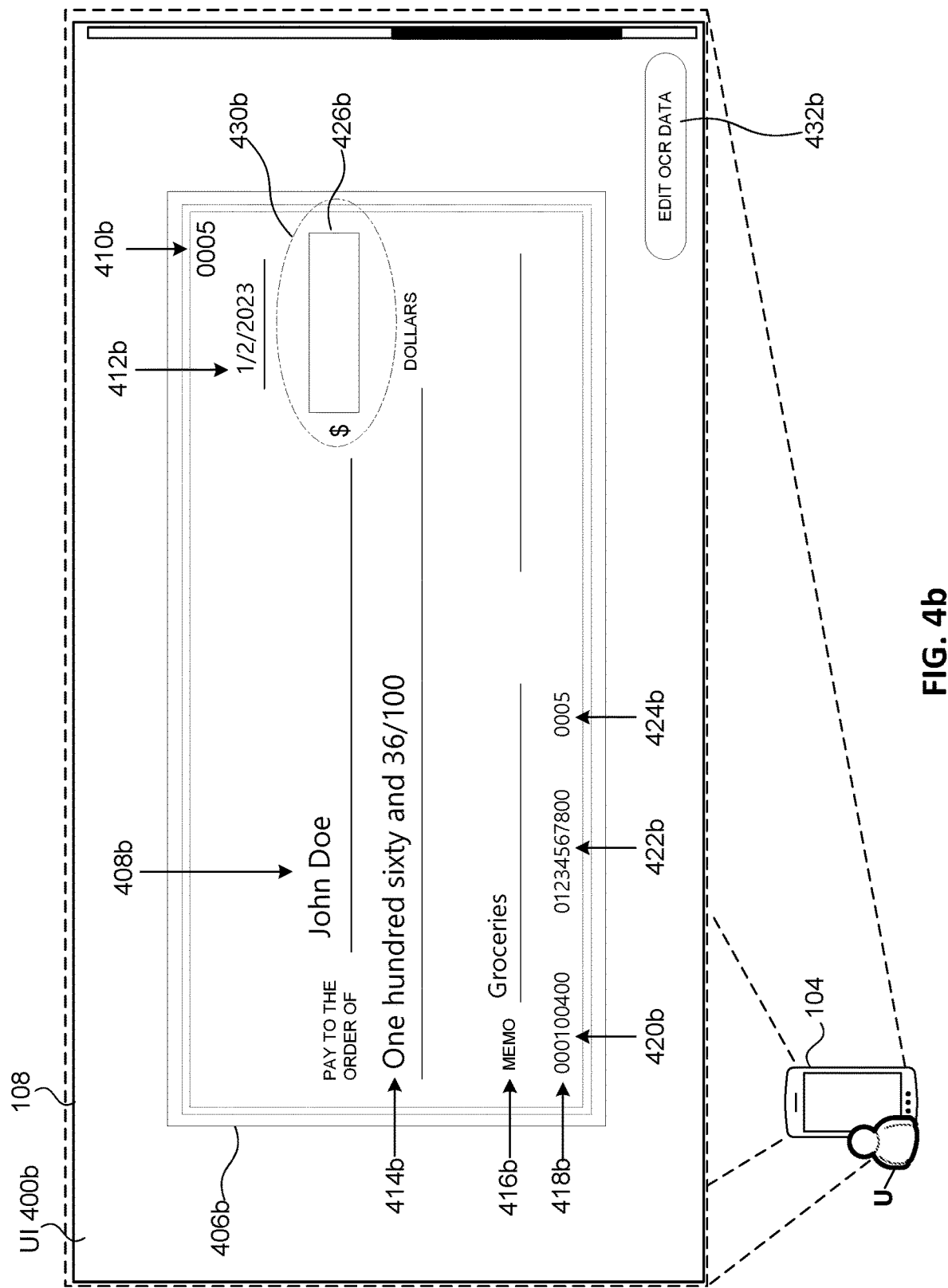
FIG. 4b illustrates an example user interface of a remote check deposit system for presenting check data.

FIG. 4b illustrates an example user interface 400b of a remote check deposit system for presenting check data. The user interface 400b is presented on a display device 108 of a mobile device 104 operated by a user U. The user interface 400b presents a check representation image 406b including OCR data generated (e.g., payee name 408b, check number 410b, date 412b, check amount in words 414b, memo 416b, MICR line data 418b including a routing number 420b, account number 422b, and check number 424b.

As mentioned briefly above with respect to FIG. 4a, the check representation image 406a, 406b is lacking the check amount in the check amount box 426a, 426b. In examples, the lacking check data is a result of the check image being of poor quality such that the OCR processing could not extract the text from the image. An indication 430b is provided on the check representation image 406b of the region lacking the required check data. In the illustrated example, the indication 430b shown on user interface 400b is an oval around the check amount box 426b, which is lacking required check data. In other examples, the indication of the check region lacking required check data can take the form of highlighting, or another type of visual cue provided on the user interface to draw attention to the check region lacking required check data. This indication on the user interface 400b provides feedback to user U regarding a problematic region of the check image. By providing specific feedback to user U regarding the lacking required check data, the problem with the check image can be remediated more easily and the lacking required check data can be obtained more quickly than if no feedback or less specific feedback regarding the problem was provided.

In examples, the lacking required check data is remediated by receiving another picture of the check image. Thus, the image capture device can be activated, and instructions presented to the user U on the user interface 400b to capture a second check image of the check that includes the lacking required check data. In some embodiments, the lacking required check data is remediated by receiving input to edit the OCR data to add the lacking required check data. Thus, in some embodiments, a selectable element 432b is presented on the user interface 400b, and when a selection of the selectable element 432b is received, the OCR data presented on the check representation image 406b can be edited. In some embodiments, the user interface 400b is configured to receive a selection of the OCR data or of the check region where check data is lacking, and the selection enables OCR data to be edited or added. For example, if the payee name presented on the check representation image does not match the name on the check itself, a selection can be received in response to a user tapping on payee name 408b, which in this example use case is "John Doe", and an option to edit the OCR data is provided. To add lacking check amount data, a selection can be received in response to a user tapping on the check amount box 426b and an option to edit the OCR data to add the check amount written on the check is provided.

In some examples, the system only permits edits to be made to pre-filled amounts on an enter details screen rather than any other fields. In some examples, the system only permits edits to a memo field or a numerical amount field. In some instances, the OCR data is used to determine the quality of the check image, so if the OCR data is not correct, then that may be used as an indication that the check image quality is not sufficiently high. However, there may be instances where the check image is quality is sufficiently high for processing, but the OCR data is nonetheless incorrect. For example, the handwriting may be poor such that the OCR produces an output that is incorrect. If the OCR data does not match the check image, then the check image may be flagged for manual processing.

Figure 4C:
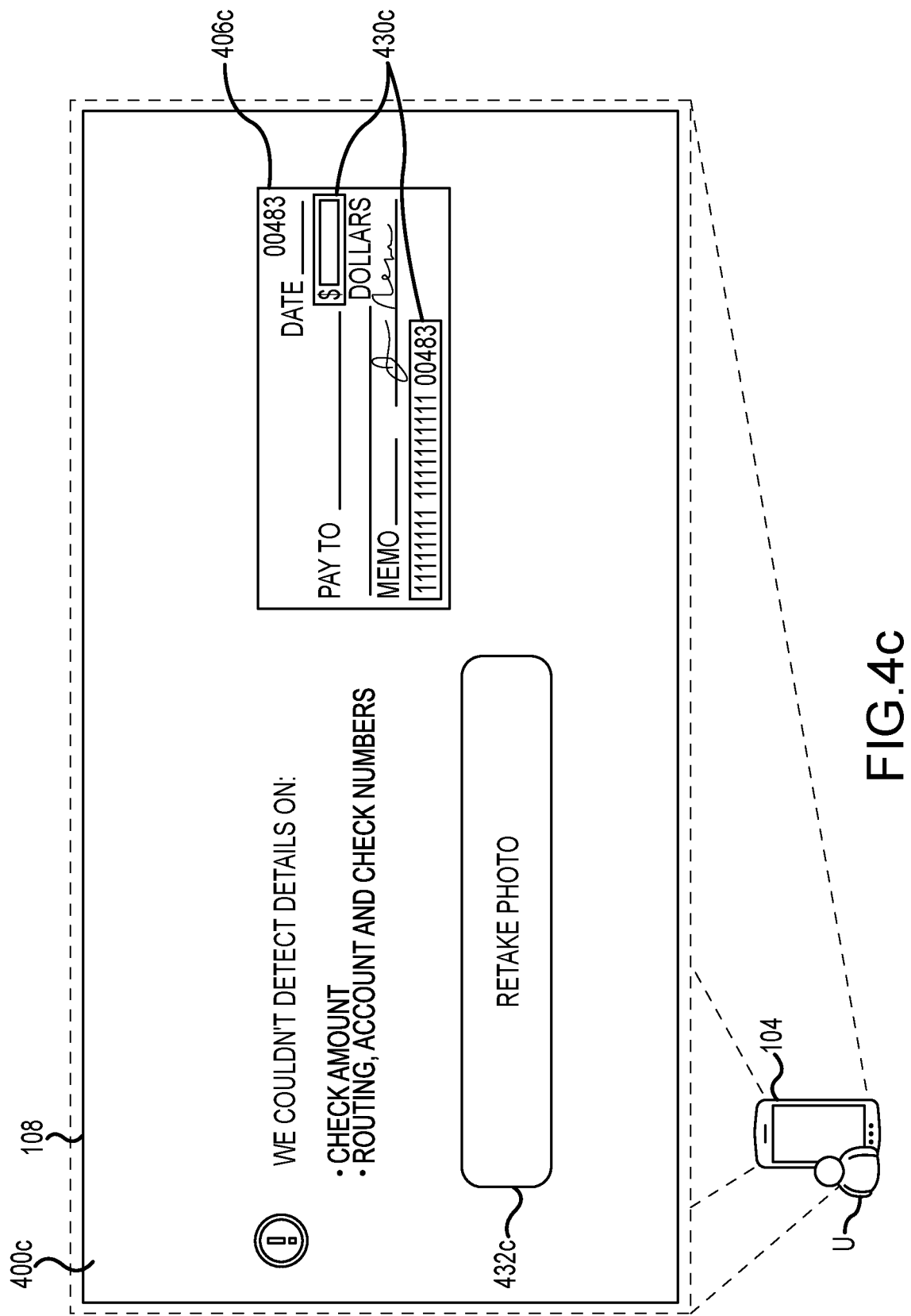
FIG. 4c illustrates an example user interface of a remote check deposit system for presenting check data.

FIG. 4c illustrates another example user interface 400c of a remote check deposit system for presenting check data. The user interface 400c is presented on a display device 108 of a mobile device 104 operated by a user U. The user interface 400c presents a check representation image 406c in the form of a check illustration having some OCR data filled in relevant locations. The user interface 400c further indicates that certain OCR data is lacking: check amount, routing number, account number, and check number. Those elements are identified on the check representation image 406c with indications 430c. In the illustrated example, the routing number, account number, and check number are filled in with dummy data (e.g., numbers that do not correspond to areal routing or accounting numbers), which can be beneficial in giving a user a sense of what the information to capture looks like. By contrast the check amount is not filled in in the check representation image. Because the user of the system may have a strong reaction to the actual check amount they see on the real check differing from the amount shown in the check representation image, it may be beneficial to leave the check amount empty rather than filled with dummy data. In an alternative example, the numeric check amount may be filled with data from the textual check amount, if such can be detected. In this illustrated example, a selectable element 432c is provided that, upon actuation discards the previously obtained check image and permits the user U to take another image.

FIG. 4d illustrates a further example user interface 400d of a remote check deposit system for presenting check data. The user interface 400d is presented on a display device 108 of a mobile device 104 operated by a user U. The user interface 400d presents a check representation image 406d in the form of a check illustration having no OCR data filled in. Rather, fields are represented as illustrated blocks or other shapes lacking alphanumeric symbols. The user interface 400d further indicates that certain OCR data is lacking: check amount, routing number, account number, and check number. Those elements are identified on the check representation image 406d with indications 430d in the form of boxes drawn around the blocks corresponding to the fields lacking data. In other instances, the blocks corresponding to the fields lacking data can be highlighted with color or content indicating that the block is lacking detectable data. In this illustrated example, a selectable element 432d is provided that, upon actuation discards the previously obtained check image and permits the user U to take another image.

Figure 4E:
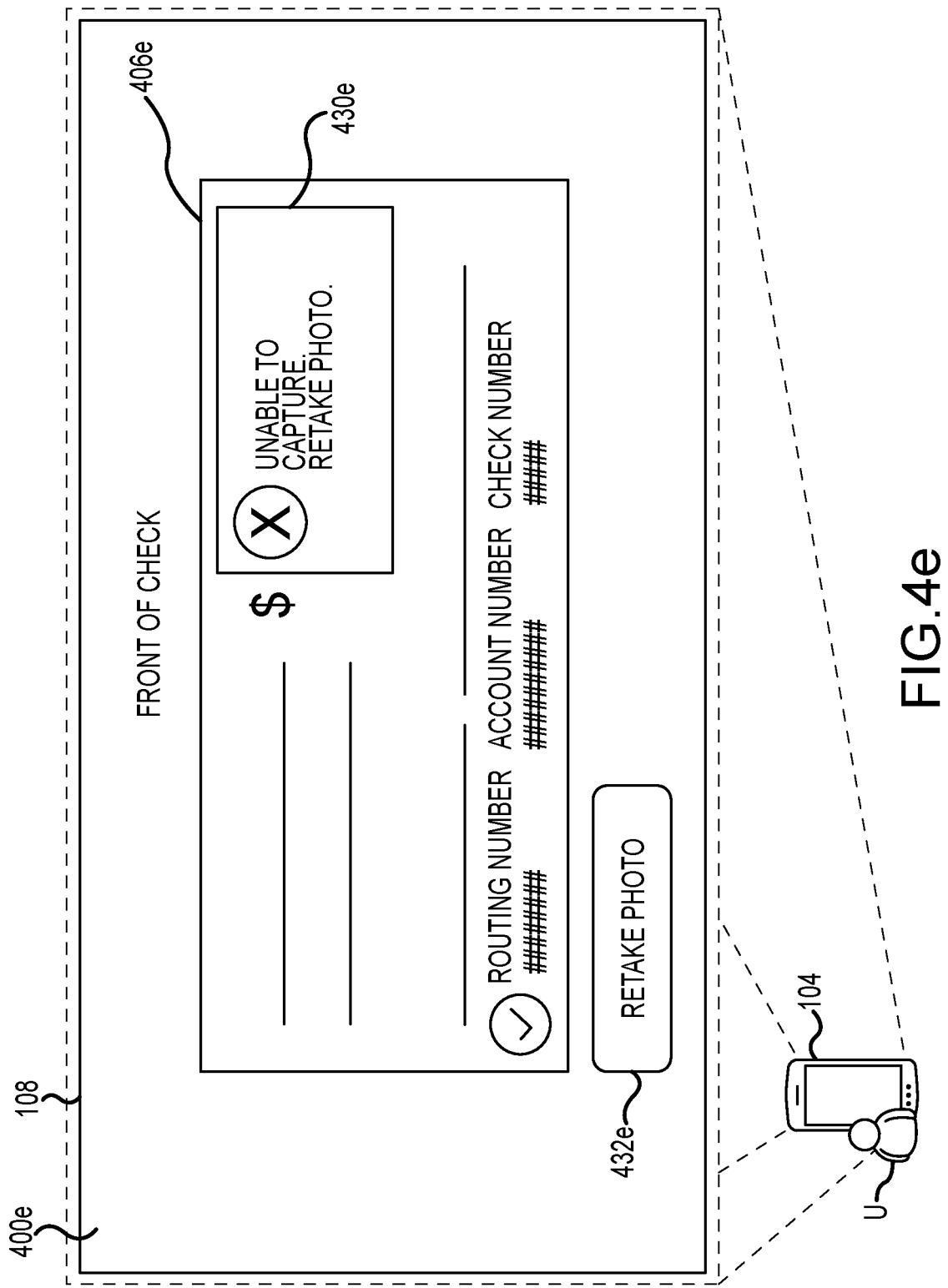
FIG. 4e illustrates an example user interface of a remote check deposit system for presenting check data.

FIG. 4e illustrates a further example user interface 400e of a remote check deposit system for presenting check data. The user interface 400e is presented on a display device 108 of a mobile device 104 operated by a user U. The user interface 400e presents a check representation image 406e in the form of a check illustration having no OCR data filled in. The user interface 400e further indicates that certain OCR data is lacking by placing an indication directly over and covering those portions of the check that are not usefully detectable. In this illustrated example, a selectable element 432e is provided that, upon actuation discards the previously obtained check image and permits the user U to take another image.

Figure 5A:
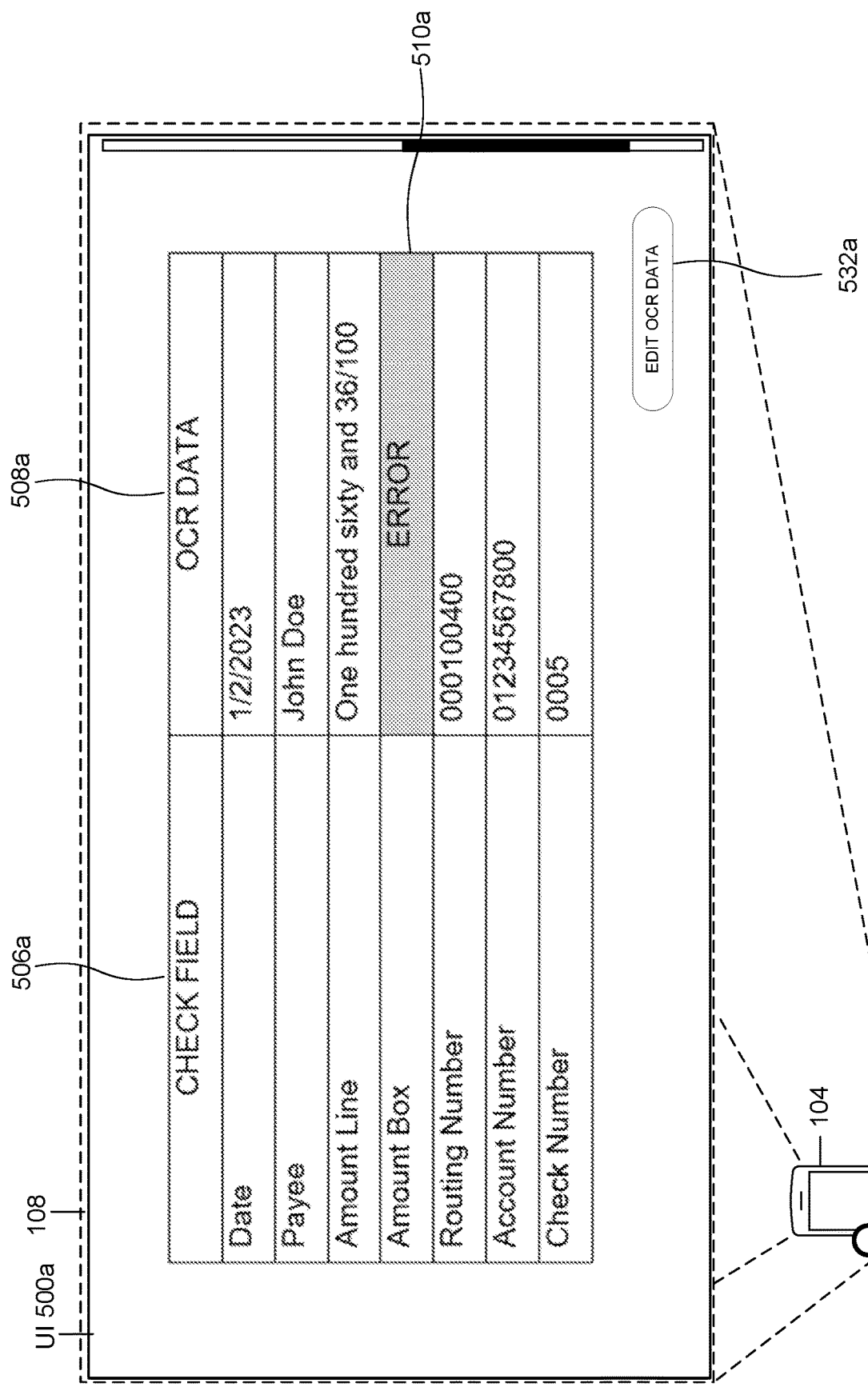
FIG. 5a illustrates an example user interface of a remote check deposit system for presenting check data.

FIG. 5a illustrates an example user interface 500a of a remote check deposit system for presenting check data. The user interface 500a is presented on a display device 108 of a mobile device 104 operated by a user U. In examples, the OCR data generated from the check image is presented on the user interface 500a in a list format. The list format includes a listing of check fields 506a, such as a listing of required check fields needed to process a check for remote deposit, along with the OCR data 508a for each check field. If any required check data is lacking, an indication of the lacking data is presented on the user interface 500a. For example, if the check amount could not be read from the check image during OCR processing, there will be no OCR data corresponding to the check amount. Thus, this field in the list format 510a presenting the OCR data can highlighted, an error message can be presented, or some other type of indication is presented indicating that required check data is lacking.

In some embodiments, the user interface 500a further includes a selectable element 532a configured to receive user input to edit the OCR data. In some embodiments, the OCR data displayed on the user interface 500a is configured to be selected, such that the user U can select OCR data to edit by tapping on the OCR data. The OCR data can be edited to correct a mistake in the OCR data or to add lacking required check data. In examples, both a check representation image and a listing of the OCR data are displayed on a user interface.

Figure 5B:
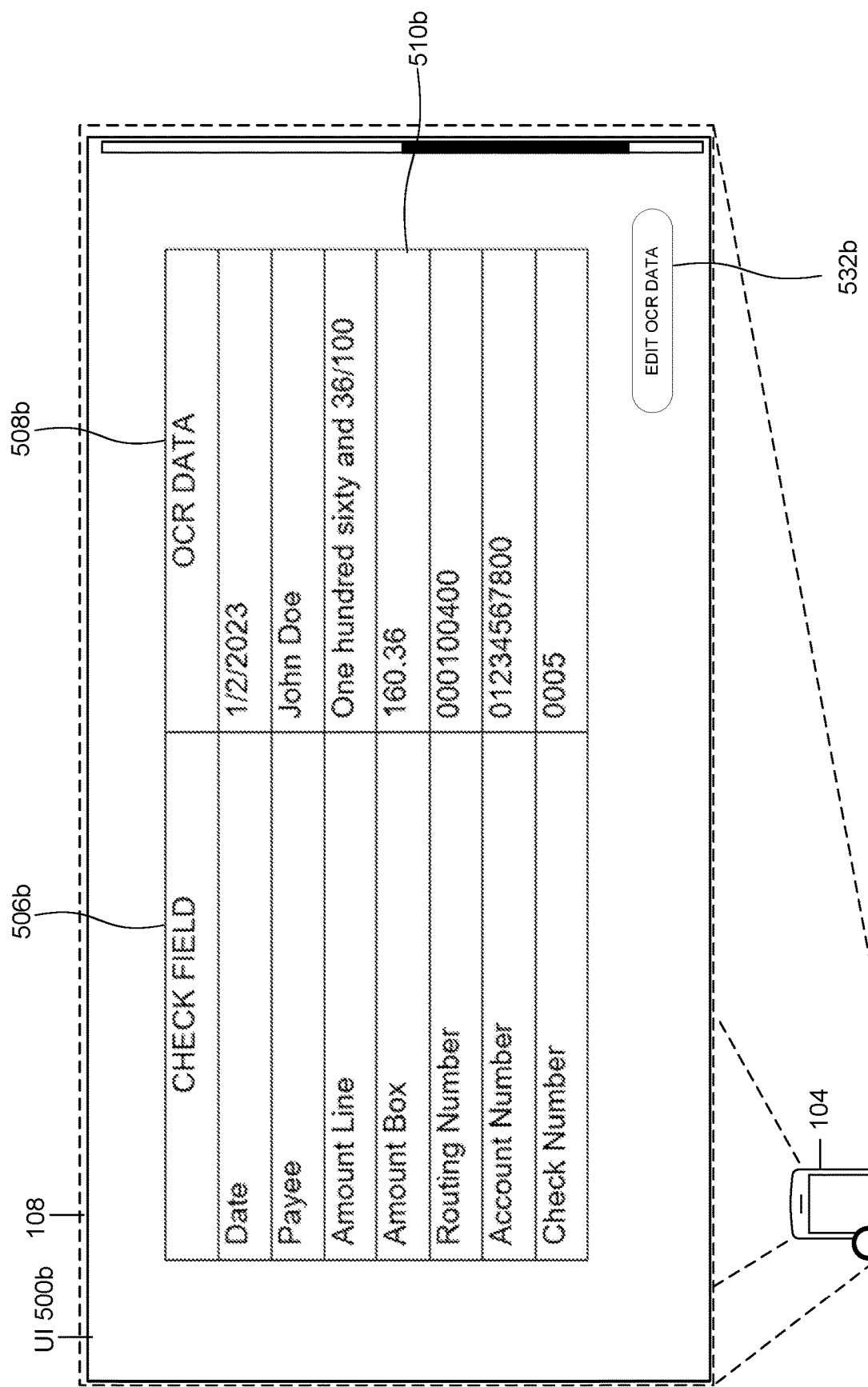
FIG. 5b illustrates an example user interface of a remote check deposit system for presenting check data.

FIG. 5b illustrates an example user interface 500b of a remote check deposit system for presenting check data. The user interface 500b is presented on a display device 108 of a mobile device 104 operated by a user U. In examples, the OCR data generated from the check image is presented on the user interface 500b in a list format, wherein the list format includes check fields 506b and the OCR data 508b corresponding to the check fields. Example user interface 500b illustrates user interface 500a discussed with reference to FIG. 5a after user U has edited the OCR data to add lacking check amount data 510b.

Figure 6:
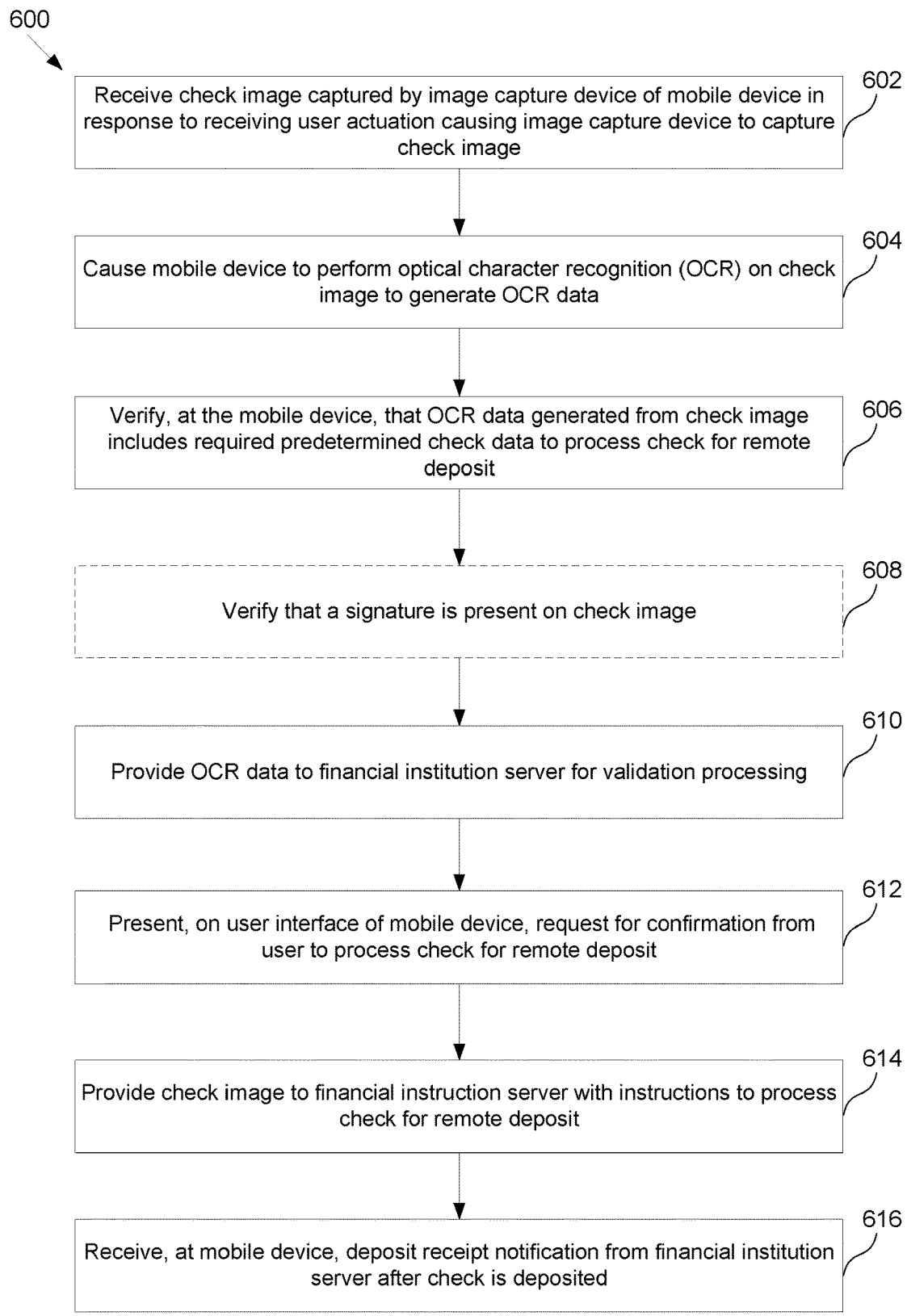
FIG. 6 illustrates an example method for remote check deposit using a mobile device.

FIG. 6 illustrates an example method 600 for remote check deposit using a mobile device 104. In some embodiments, the method 600 is performed by a mobile banking application executed on a mobile device 104, such as mobile device 104 and mobile application 120 described above with reference to FIG. 1. The method 600 begins by receiving, at the mobile application executed on the mobile device 104, a check image captured by an image capture device of the mobile device 104 in response to receiving a user actuation causing the image capture device to capture the check image at operation 602. In examples, receiving a check image in operation 602 includes receiving a check image of a front side of the check and a check image of the back side of the check. The capturing of a check image is described in more detail above with respect to FIG. 2.

At operation 604, the mobile application causes the mobile device 104 to perform OCR on the received check image to generate OCR data, such as is described above in operation 304.

At operation 606, the OCR data is verified locally at the mobile device 104 during on-device check image verification processing. The on-device check image verification processing confirms that the OCR data generated from the check image includes required check data necessary for processing the check for remote deposit. This can be performed in a manner at least similar to that described above in relation to operation 308.

At operation 608, in addition to verification of the OCR data, the mobile application executed on the mobile device 104 can verify that a signature is present on the check image, such as is described above in relation to operation 308.

At operation 610, the OCR data is provided to a financial institution server 124 for validation processing at operation 610. The OCR data is provided to the financial institution server 124 at operation 610 without providing the check image to the financial institution server 124. The validation processing at operation 610 is a first level of validation processing by the financial institution server 124 based only the received OCR data. If the OCR data has been edited by the user, either to correct the OCR data or to enter missing required check data, the OCR data is provided to the financial institution server 124 at operation 610 along with instructions for manual review of the OCR data. The providing the data and the verification processing can be as described above.

In response to receiving a confirmation notification from the financial institution server 124 at the mobile device 104 that the OCR data has been validated, a request for confirmation is presented on the user interface of the mobile device 104 at operation 612. The request for confirmation requests that a user either confirm or cancel the remote check deposit process. If no confirmation is received confirming that the check should continue to be processed for remote deposit (e.g., input is received via the user interface to cancel the remote deposit), then the remote deposit process will be canceled, and the check will not be remotely deposited. If confirmation is received confirming that that check should be processed for remote deposit (e.g., input is received via the user interface to confirm remote deposit), then the check will be processed for remote deposit.

At operation 614, in response to receiving a confirmation via the user interface to process the check for remote deposit, the check image is provided to the financial institution server 124 with instructions to process the check for remote deposit. In some embodiments, the check image is provided to the financial institution server 124 at operation 614 in a different transmission file than the OCR data that was provided to the financial institution server 124 at operation 610.

The financial institution server 124 then continues processing the check for deposit using the check image. The financial institution performs additional verification on the check image, such as additional fraud detection verification, which can include analyzing handwriting, ink color, date style, signature, endorsement signature, etc. to detect if the check has been modified after it was drafted by the payor. After additional verification of the check image and OCR data by the financial institution server 124, a memo is posted on the user's bank account showing the check deposit amount. The financial institution server 124 then writes a log record of the check to capture the details of check being processed for remote check deposit.

Figure 7:
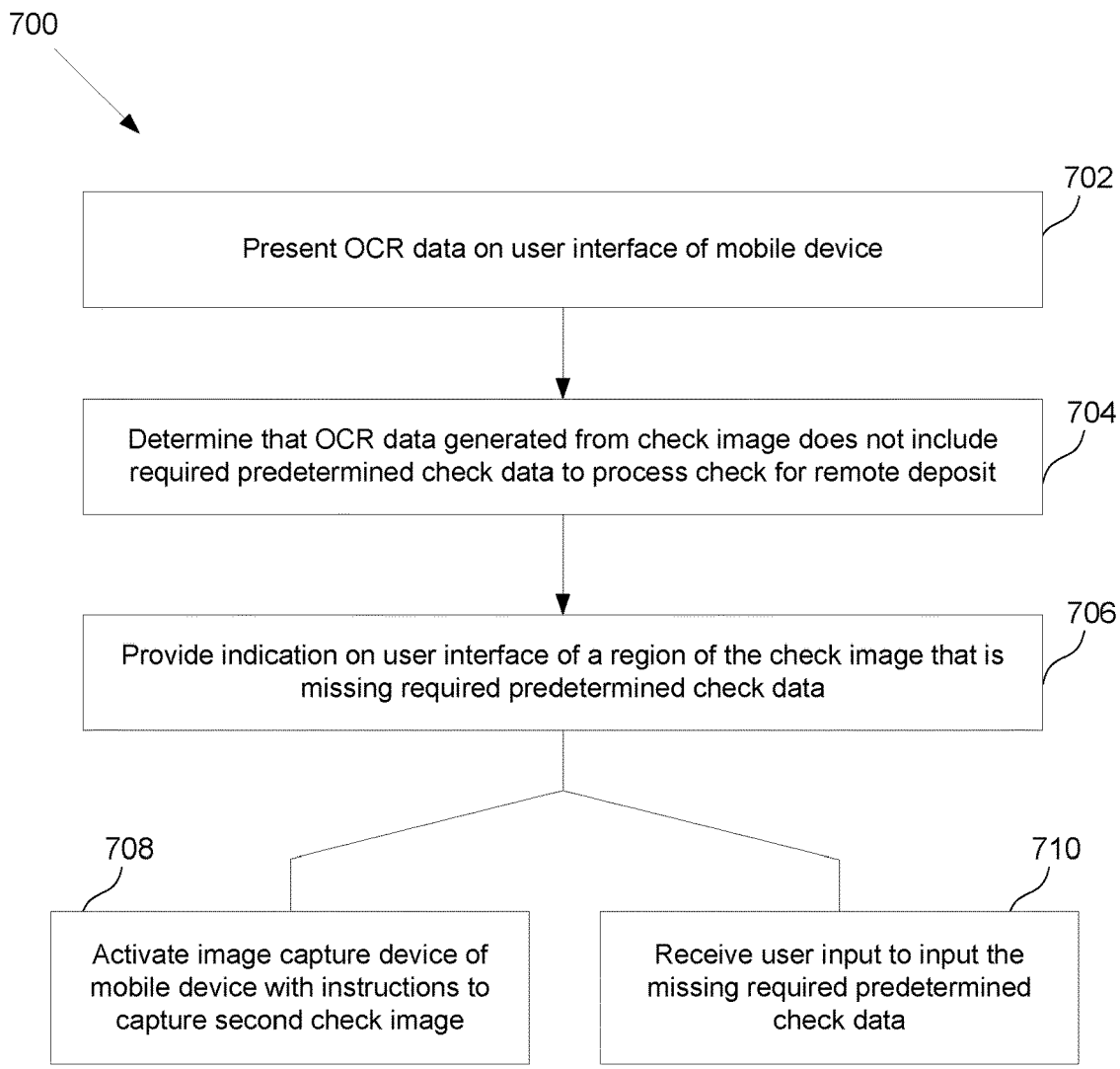
FIG. 7 illustrates an example method for remote check deposit using a mobile device.

When the financial institution server 124 has completed the remote check deposit process, the mobile device 104 receives a deposit receipt notification from the financial institution server 124 at operation 616. In some embodiments, the deposit receipt notification is a push notification presented on the user interface of the mobile device 104. In addition or instead, an email or instant message notification can be sent as well as posted transaction appears in activity history FIG. 7 illustrates an example method 700 for remote check deposit using a mobile device 104. The method 700 is performed by a mobile application executing on a mobile device 104, such as mobile device 104 and mobile application 120 described above with reference to FIG. 1. In examples during remote check deposit, after a check image has been received and OCR has been performed on the check image, the OCR data is presented on the user interface of the mobile device 702. In some embodiments, the OCR data is presented on a check representation image, wherein the check representation image is an illustration representing the check image and not the check image itself. Example user interfaces presenting OCR data on a check representation image are described in greater detail with respect to FIGS. 4a-4e. In some embodiments, the OCR data is presented in a list format. In some examples, the OCR data is not user editable. In other examples, the OCR data is editable. Example user interfaces presenting OCR data in a list format are described in greater detail with respect to FIG. 5a and FIG. 5b.

During on-device check image verification processing, when verifying that the OCR data generated from the check image includes required check data to process the check for remote deposit, in some embodiments, the mobile application executed on the mobile device determines that the OCR data generated from the check image does not include the required check data to process the check for remote deposit at operation 704. This determination is made by comparing the generated OCR data to predetermined required check data fields (e.g., check amount, account number, routing number). For example, if a check amount is a required check data field but no check amount data is included in the OCR data generated from the check image, then the mobile application determines at operation 704 that the OCR data does not include all the required check data to process the check for remote deposit.

At operation, 706, based on the determination that the OCR data generated from the check image does not include the required predetermined check data to process the check for remote deposit at operation 704, an indication is provided on the user interface of a region of the check image or a check field that is lacking the required check data to process the check for remote deposit. For example, a region on a check representation image lacking required check data can be circled or highlighted, or a listing of OCR data can show an error where a check field is lacking data. Example user interfaces displaying an indication of a region or check field lacking required check data are shown in FIGS. 4b-4e and FIG. 5b.

In some embodiments, the lacking check data is remediated by receiving another check image that includes the lacking data, or by receiving edits to the OCR to input the lacking data. At operation 708, the image capture device of the mobile device 104 is activated with instructions to capture second check image of check, wherein the second image includes the lacking data. At operation 710, user input is received to input the lacking required check data. For example, if the check amount is lacking from the data, input is received caused by the user manually entering in the check amount written on the check. If user input is received to enter the lacking required check data at operation 710, the mobile device 104 repeats the verification step (operation 606) described with reference to FIG. 6 to verify that the OCR data includes the required check data to process the check for remote deposit. If the OCR data is verified, the remote check deposit process can continue with providing the OCR data to a financial institution server 124 for validation processing, presenting a request for confirmation from a user to process the check for remote deposit, providing the check image to the financial institution server 124 with instructions to process the check for remote deposit, and receiving, at the mobile device 104, a deposit receipt notification from the financial institution server 124 after the check is deposited.

Example User Interface Workflow

FIGS. 8-16 illustrate example user interfaces on a mobile device 104 running an example implementation of the mobile application 120 that implements a modified version of method 300.

Figure 8:
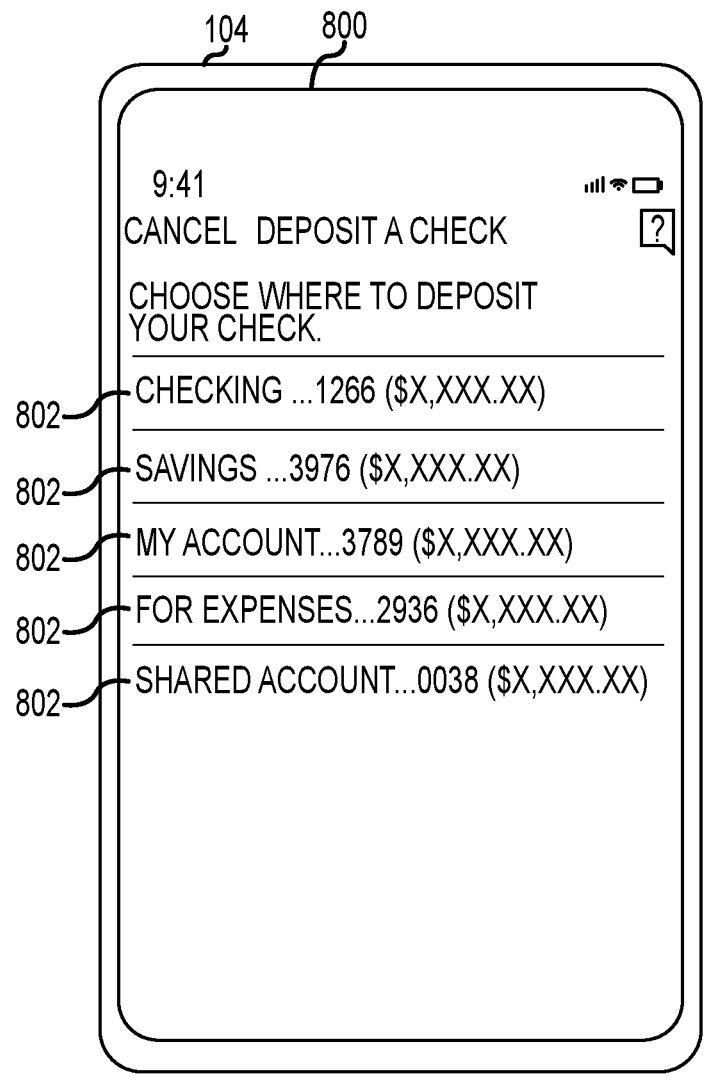
FIG. 8 illustrates a mobile device running an example implementation of a mobile application showing a first user interface.

FIG. 8 illustrates a mobile device 104 running an example implementation of the mobile application 120 showing a first user interface 800. The first user interface 800 is arrived at after receiving an indication that the user wants to deposit a check. The first user interface 800 asks the user to select where the user wants to deposit a check. The first user interface 800 includes a set of user-actuatable user interface elements 802 that correspond to accounts of the user. Following actuation of one of the user-actuatable user interface elements 802, the mobile device 104 can display the second user interface 900 as shown in FIG. 9.

Figure 9:
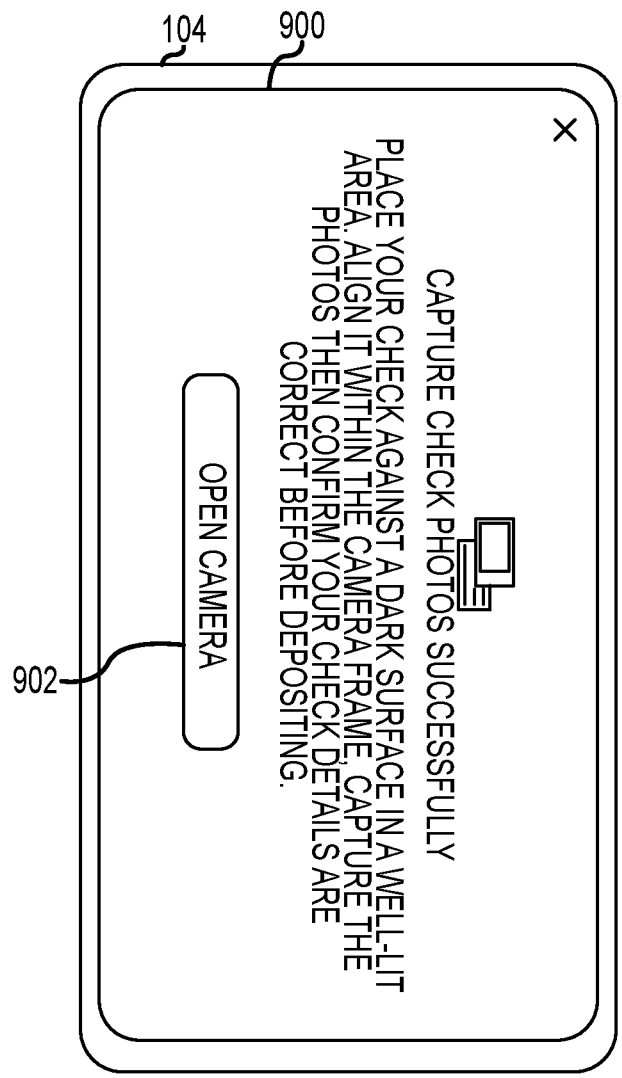
FIG. 9 illustrates a mobile device running an example implementation of a mobile application showing a second user interface.

FIG. 9 illustrates the mobile device 104 running the example implementation of the mobile application 120 showing a second user interface 900. The second user interface 900 includes advice to the user for capturing a check image and has user actuatable button 902 to open a camera of the mobile device 104 for obtaining the check image. In some examples, user consent to access the camera of the mobile device 104 is obtained. Following actuation of the user actuatable button 902, the mobile device 104 displays the third user interface 1000 as shown in FIG. 10.

Figure 10:
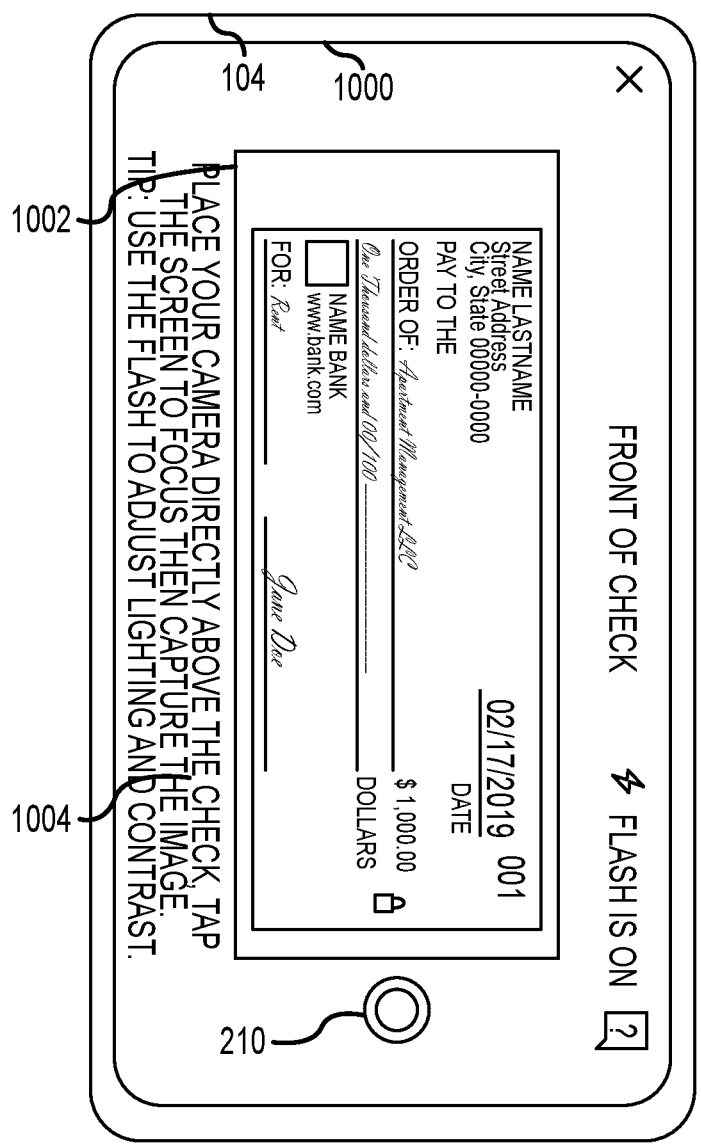
FIG. 10 illustrates a mobile device running an example implementation of a mobile application showing a third user interface.

FIG. 10 illustrates the mobile device 104 running the example implementation of the mobile application 120 showing a third user interface 1000. The third user interface 1000 includes a live preview 1002 of the camera viewfinder, a capture button 210, and instructions 1004 to the user to take a picture of a front of the check 102. advice to the user for capturing a check image and has user actuatable button to open a camera of the mobile device 104 for obtaining the check image. Following actuation of the capture button 210, the mobile device 104 may execute operations 302 and 304 as described above. Following actuation of the capture button 210, the mobile device 104 displays the fourth user interface 1100 as shown in FIG. 11.

Figure 11:
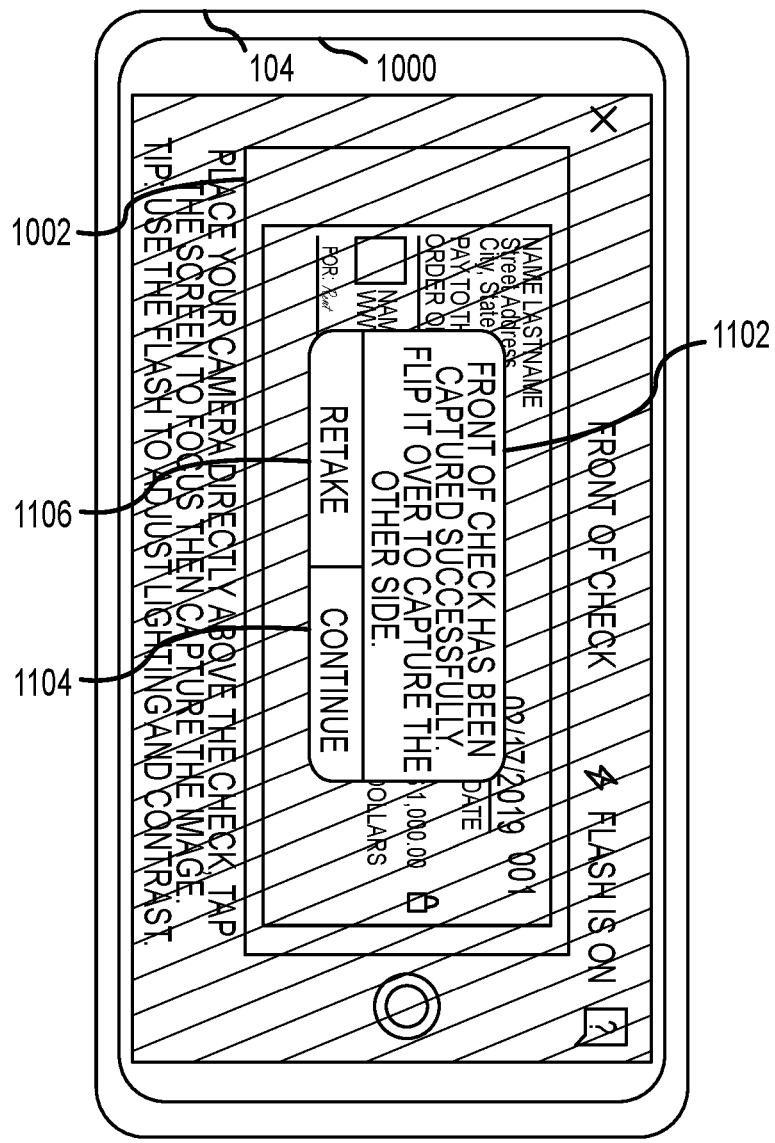
FIG. 11 illustrates a mobile device running an example implementation of a mobile application showing a fourth user interface.

FIG. 11 illustrates the mobile device 104 running the example implementation of the mobile application 120 showing a fourth user interface 1100. The fourth user interface 1100 includes a prompt 1102 indicating that the check image of the front of the check 102 was successfully obtained. The user may choose a continue button 1104 or a retake button 1106. Behind the prompt, the live preview 1002 of the camera viewfinder continues. In other implementations, the live preview 1002 may be paused or absent until the user presses the continue button 1104.

In this instance, the check image of the front of the check was successfully obtained. For instance, as described above, the required check data may be determined to be present (see operation 308, above). Further, in this instance, the OCR data was not presented on a check representation image. In other instances, notwithstanding the successful obtaining of the check image, the mobile application 120 may provide the check representation image with the correct data (e.g., a check representation as shown in FIG. 4a but with all required data present) or a tabular representation with the correct data as shown in FIG. 5b. The mobile application 120 may provide the user with an opportunity to edit such data. In other scenarios, however, the image might not have been successfully obtained. For instance, the flow of the method 300 may follow the "NO" path from operation 308 to operation 312 and proceed accordingly.

Figure 12:
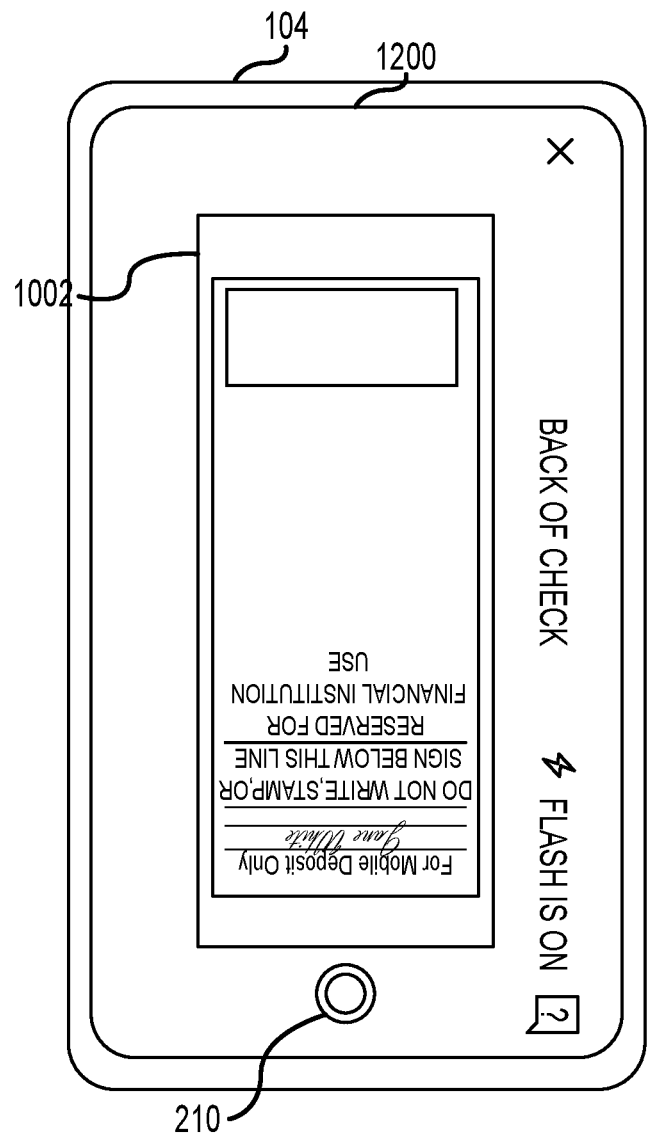
FIG. 12 illustrates a mobile device running an example implementation of a mobile application showing a fifth user interface.

In response to the user actuating the continue button 1104, the mobile application 120 causes the mobile device 104 to display the fifth user interface 1200 as shown in FIG. 12.

Figure 13:
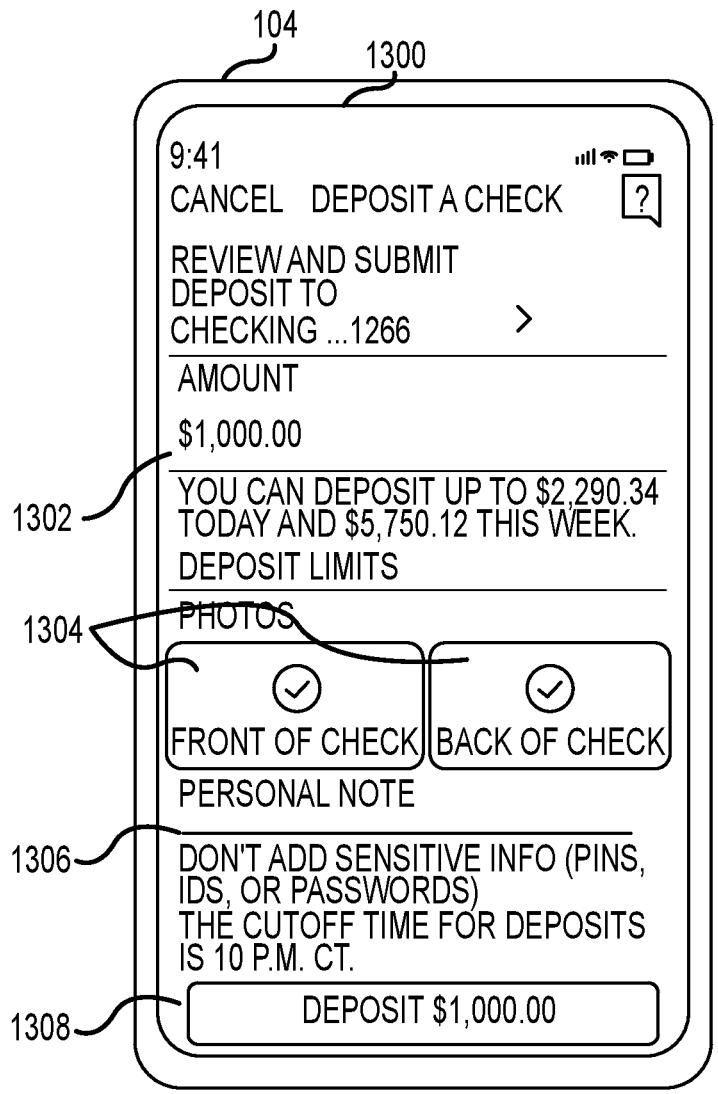
FIG. 13 illustrates a mobile device running an example implementation of a mobile application showing a sixth user interface.

FIG. 12 illustrates the mobile device 104 running the example implementation of the mobile application 120 showing a fifth user interface 1200. The fifth user interface 1200 includes a live preview 1002 of the camera viewfinder, a capture button 210, and instructions to the user to take a picture of a back of the check 102. Following actuation of the capture button 210, the mobile device 104 may execute operations 302 and 304 as described above. If the application determines that the resulting check image does not include the required data, then the flow of the method 300 can move to operation 312 and proceed accordingly. If the mobile application 120 determines that resulting check image includes required data, then the mobile device 104 displays the sixth user interface 1300 as shown in FIG. 13. In some instances, prior to moving to the sixth user interface as shown in FIG. 13, a confirmation screen similar to that shown in FIG. 11 can be shown.

FIG. 13 illustrates the mobile device 104 running the example implementation of the mobile application 120 showing a sixth user interface 1300. The sixth user interface 1300 includes a field 1302 indicating the amount of the check 102 (e.g., as determined from the OCR data) and having a deposit button actuatable to initiate deposit of the check. Further, the sixth user interface 1300 includes indications 1304 that photos of the front of the check and the back of the check were successfully obtained (e.g., with a green check mark), but lacks a preview of the images and lacks a way for a user to view the images. The sixth user interface 1300 further includes a field 1306 in which the user can specify a personal note regarding the check 102. The user may actuate the deposit button 1308 to cause the mobile application 120 to perform operation 318 as described above to provide OCR data to the financial institution server for validation processing. Responsive to receiving confirmation that the server validated the OCR data (operation 320), the mobile device 104 displays the seventh user interface 1400 as shown in FIG. 14.

Figure 14:
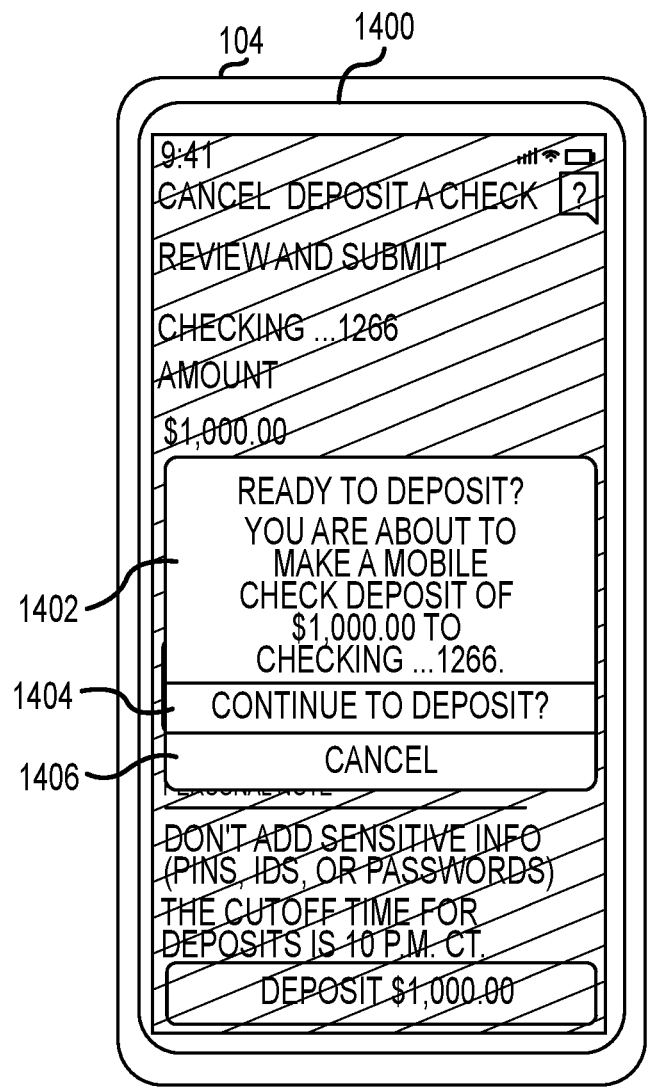
FIG. 14 illustrates a mobile device running an example implementation of a mobile application showing a seventh user interface.

FIG. 14 illustrates the mobile device 104 running the example implementation of the mobile application 120 showing a seventh user interface 1400. The seventh user interface 1400 includes a prompt 1402 to confirm whether the user is ready to deposit by hitting a confirm deposit button 1404 or wants to cancel by pressing a cancel button 1406. This can correspond to operation 324 as described above and responsive to failing to receive the confirmation, the flow of the method can move to operation 328 and responsive to receiving the confirmation via the confirm deposit button 1404, the flow can move to operations 330 and 332 as shown in the eighth user interface 1500 as shown in FIG. 15.

Figure 15:
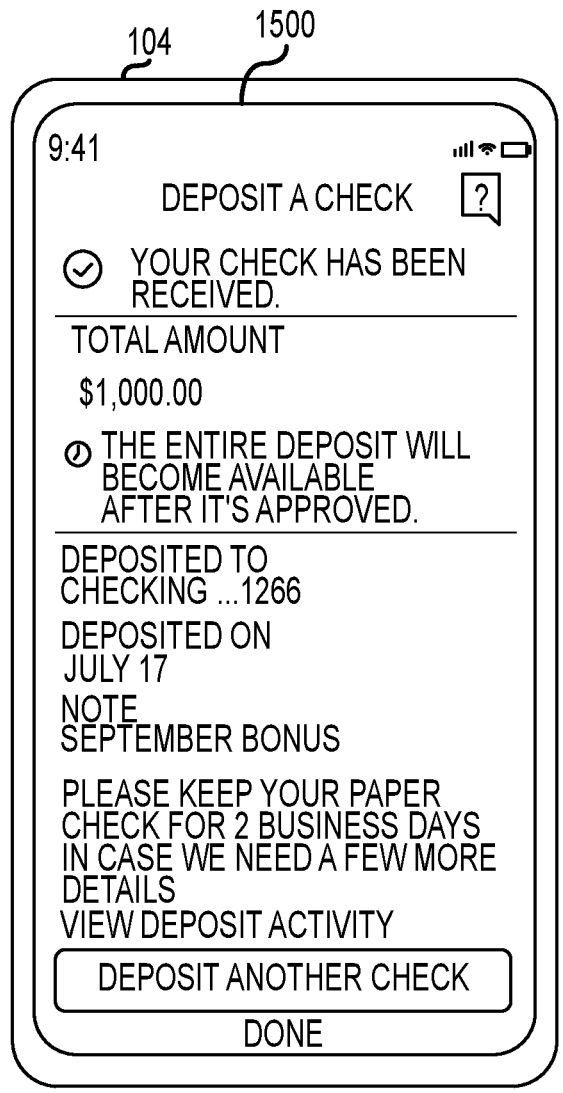
FIG. 15 illustrates a mobile device running an example implementation of a mobile application showing an eighth user interface.

FIG. 15 illustrates the mobile device 104 running the example implementation of the mobile application 120 showing an eighth user interface 1500. The eighth user interface 1500 includes an indication that the check has been received by the server. The eighth user interface 1500 further indicates that although the check has been received, the deposit will not be fully available until after it is approved.

Computing System

Figure 16:
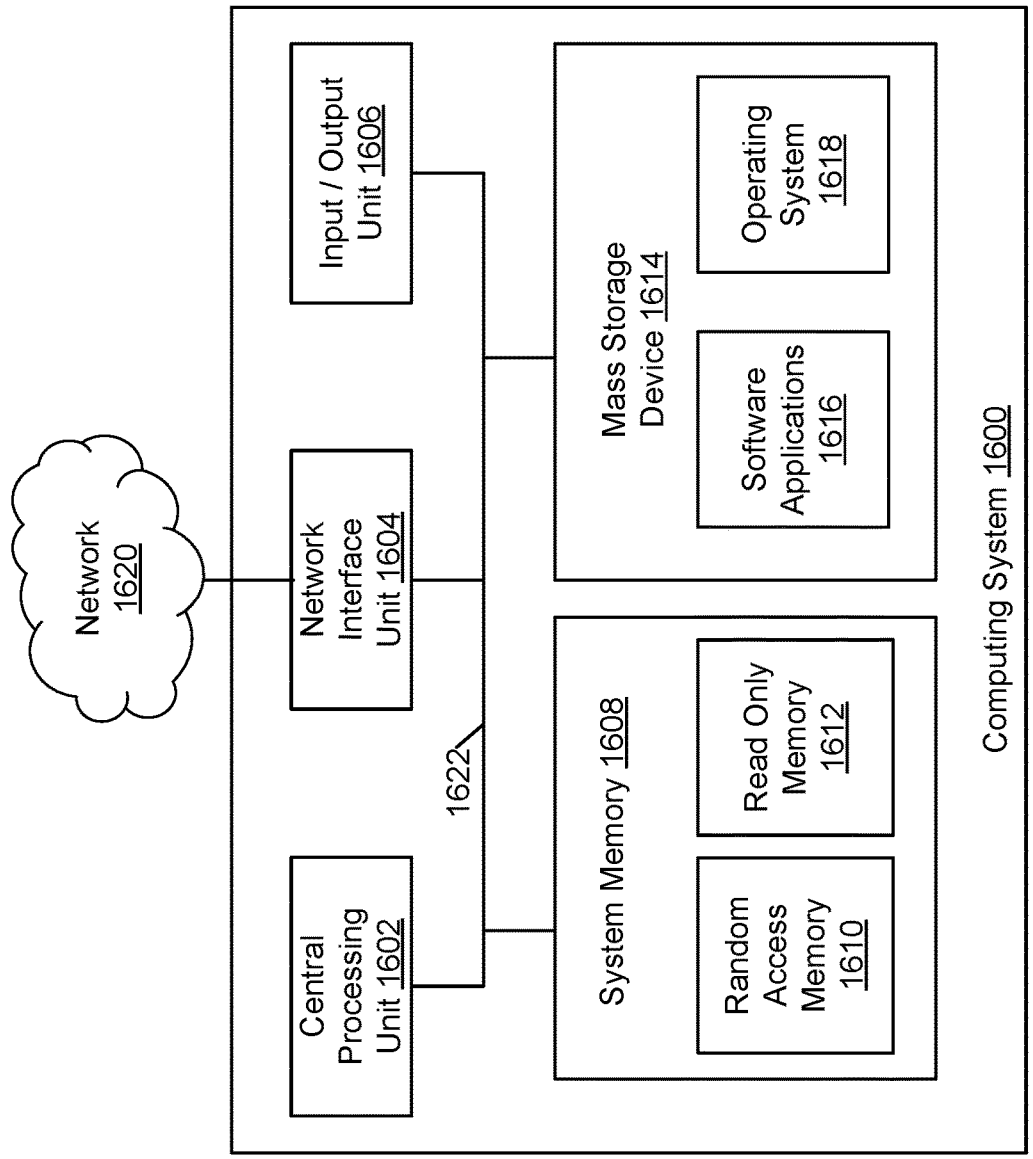
FIG. 16 illustrates an example block diagram of a virtual or physical computing system usable to implement aspects of the present disclosure.

FIG. 16 illustrates an example block diagram of a virtual or physical computing system 1600. One or more aspects of the computing system 1600 can be used to implement remote check deposit systems described herein.

In the embodiment shown, the computing system 1600 includes one or more processors 1602, a system memory 1608, and a system bus 1622 that couples the system memory 1608 to the one or more processors 1602.

The one or more processors 1602 are components that execute instructions, such as instructions that obtain data, process the data, and provide output based on the processing. The one or more processors 1602 often obtain instructions and data stored in the memory 1608. The one or more processors 1602 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. Example providers processors 1602 include INTEL, AMD, QUALCOMM, TEXAS INSTRUMENTS, and APPLE.

The system memory 1608 includes RAM (Random Access Memory) 1610 and ROM (Read-Only Memory) 1612. The computing system 1600 further includes a mass storage device 1614. The mass storage device 1614 is able to store software instructions and data, such as those that, when executed by the one or more processors 1602 cause the one or more processors to perform operations described herein.

The mass storage device 1614 is connected to the one or more processors 1602 through a mass storage controller (not shown) connected to the system bus 1622. The mass storage device 1614 and its associated computer-readable data storage media provide non-volatile, non-transitory storage for the computing system 1600. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1600.

According to various embodiments described herein, the computing system 1600 operates in a networked environment using logical connections to remote network devices through the network 1620. The network 1620 is a computer network, such as an enterprise intranet and/or the Internet. The network 1620 can include a LAN, a Wide Area Network (WAN), the Internet, wireless transmission mediums, wired transmission mediums, other networks, and combinations thereof. In some embodiments, the computing system 1600 connects to the network 1620 through a network interface unit 1604 connected to the system bus 1622. It should be appreciated that the network interface unit 1604 can also be utilized to connect to other types of networks and remote computing systems.

The computing system 1600 also includes an input/output controller 1606 for receiving and processing input from a number of other devices, including a touch user interface display screen, or another type of input device. Similarly, in some embodiments, the input/output controller 1606 provides output to a touch user interface display screen or other type of output device. Examples of interfaces that the input/output controller 1606 can facilitate interaction with include components that facilitate receiving input from and providing output to something external to the computing system 1600, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display).

As mentioned briefly above, the mass storage device 1614 and the RAM 1610 of the computing system 1600 can store software instructions and data. The software instructions can include an operating system 1618 suitable for controlling the operation of the computing system 1600. In addition, the memory 1608 or mass storage device 1614 can include a basic input/output system that contains the basic routines that help to transfer information between elements within the computing system 1600, such as during startup. The mass storage device 1614 and/or the RAM 1610 also store software instructions, that when executed by the one or more processors 1602, cause one or more of the systems, devices, or components described herein to provide functionality described herein. For example, the mass storage device 1614 and/or the RAM 1610 can store software instructions that, when executed by the one or more processors 1602, cause the computing system 1600 to receive and execute managing network access control and build system processes.

The computing system 1600 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein. Such tools can include intelligent code completion tools (e.g., INTEL-LISENSE) and artificial intelligence tools (e.g., GITHUB COPILOT).

One or more techniques described herein can benefit from or be implemented using a machine learning framework. A machine learning framework is a collection of software and data that implements artificial intelligence trained to provide output based on input. Examples of artificial intelligence that can be implemented in a trainable way include neural networks (including recurrent neural networks), language models (including so-called "large language models"), generative models, natural language processing models, adversarial networks, decision trees, Markov models, support vector machines, genetic algorithms, others, or combinations thereof. Machine learning frameworks or components thereof are often built or refined from existing frameworks, such as TENSORFLOW by GOOGLE, INC. or PYTORCH by the PYTORCH community. The machine learning framework $\beta00$ can include one or more models that are the structured representation of learning and an interface that supports use of the model.

The model can take any of a variety of forms. In many examples, the model includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model $\beta02$ can include a representation of memory (e.g., providing long short-term memory functionality). Where the set includes more than one model, the models can be linked, cooperate, or compete to provide output.

The interface can include software procedures (e.g., defined in a library) that facilitate the use of the model, such as by providing a way to interact with the model (e.g., receive and prepare input, processing the input with the model and provide output). The interface can define a vector embedding technique for creating a representation of data usable as input into the model. Example embedding techniques include Word2Vec and BERT. The software can further provide the ability to create, customize, fine tune, and train the model.

In an example implementation, interface can provide a training method that includes initializing a model, obtaining training data, providing a portion of the training data to the model to produce an actual output, comparing the expected output with the actual output, updating the model based on the result of the comparison (e.g., updating weights of the model, such as using backpropagation), continuing providing training data and updating the model until a stopping criterion has been reached, and deploying the trained model for use in production.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

This application incorporates certain other applications by reference. To the extent that there is a conflict between the material in this specification and the material that is incorporated by reference, the subject matter of this specification (as opposed to the incorporated one) controls for the purposes of resolving that conflict.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to".

What is claimed is:

1. A method for remote deposit of a check, the method comprising:
   receiving a first check image captured by an image capture device of a mobile device in response to receiving a user actuation causing the image capture device to capture the first check image; and
   after receiving the first check image and without displaying the first check image to a user:
     at the mobile device and without any check image of the check being sent from the mobile device to a server:
       causing the mobile device to perform optical character recognition (OCR) on the first check image to generate first OCR data;
       determining that the first OCR data generated from the first check image lacks required predetermined check data to process the check for remote deposit, wherein the required predetermined check data includes an amount and MICR line data, wherein the MICR line data includes an account number, a routing number, and a check number;
       generating a check representation image that is not the first check image and that includes at least a portion of the first OCR data and an indication provided on the check representation image at a region of the check representation image associated with the lacking predetermined check data;
       presenting the check representation image;
       after presenting the check representation image:
         discarding the first check image; and
         receiving a remediation, wherein receiving the remediation includes:
           receiving another user actuation causing the image capture device to capture a second check image, and
           performing a second OCR on the second check image, thereby generating second OCR data; and
       after verifying that the second OCR data associated with the remediation includes the required predetermined check data that the first OCR data lacked, providing the second OCR data to a financial institution server for validation processing;
     at the financial institution server:
       performing duplication detection processing using the second OCR data;
       performing fraud detection processing; and
       after the duplication detection processing and the fraud detection processing, sending a confirmation notification that the provided second OCR data has been validated;
     at the mobile device:
       receiving the confirmation notification from the financial institution server that the provided second OCR data has been validated;
       in response to receiving the confirmation notification, presenting, on a user interface of the mobile device, a request for confirmation from a user to process the check for remote deposit;
       receiving a user confirmation from the user in response to the request for confirmation from the user to process the check for remote deposit;
       in response to receiving the user confirmation from the user, providing the second check image to the financial institution server.

2. The method of claim 1, wherein the remediation further includes user input that modifies the first OCR data to form the second OCR data.

3. The method of claim 2, wherein the fraud detection processing or a subsequent fraud detection processing includes a manual review responsive to the remediation being the modification of the first OCR data to form the second OCR data.

4. The method of claim 1, further comprising:

activating the image capture device of the mobile device; and providing instructions for the user to capture the second check image of the check.

5. The method of claim 1, further comprising:

presenting at least a portion of the second check image or an image derived from the second check image to a user for a first time only after the check is deposited.

6. The method of claim 1, wherein generating the check representation image includes:

selecting a check representation image template; and populating the template with values from the first OCR data.

7. The method of claim 6, further comprising:

determining whether the first check image is of the front of the check; and wherein selecting the check representation image template includes selecting a front template responsive to determining that the first check image is of the front of the check.

8. The method of claim 7, wherein selecting the check representation image template includes selecting the check representation image template from among a plurality of check representation image templates.

9. The method of claim 1, wherein generating the check representation image does not preserve stylistic content from the first check image.

10. The method of claim 1, wherein generating the check representation image includes preserving stylistic content from the first check image without directly importing stylistic elements from the first check image.

11. The method of claim 10, wherein preserving stylistic content without directly importing stylistic elements from the first check image includes performing at least one operation selected from a set of operations consisting of:

selecting a font based on handwriting in the first check image;

selecting a color based on an ink in the first check image;

selecting a scale of an element in the check representation based on a scale of a corresponding element in the first check image; and selecting a position of an element in the check representation based on a scale of a corresponding element in the first check image.

12. The method of claim 1, wherein the portion of the first check image that would contain the lacking predetermined check data is out of frame; and wherein the check representation image includes a portion that corresponds to the portion of the first check image that would contain the lacking predetermined check data.

13. The method of claim 1, further comprising:

at the financial institution server:

receiving the second check image after the duplication detection processing and the fraud detection processing.

14. The method of claim 1, further comprising:

sending an account identification number from the mobile device to the server only after receiving a user confirmation from the user in response to the request for confirmation from the user to process the check for remote deposit.

15. The method of claim 1, further comprising:

at the mobile device and prior to providing the second OCR data to a financial institution server for validation processing:

determining a similarity value between the second OCR data and prior OCR data sent to the server, wherein providing the second OCR data to the financial institution server for validation processing occurs responsive to the similarity failing to pass a threshold.

16. The method of claim 1, further comprising:

prohibiting the user actuation from causing the image capture device to capture the check image unless a usability metric is met.

17. The method of claim 1, wherein providing the second check image to the financial instruction server with instructions to process the check for remote deposit includes providing both a front check image of a front of the check and a back check image of a back of the check.

18. The method of claim 1, wherein the check representation image includes at least one feature indicating that the check representation image is not the first check image;

wherein the method further comprises presenting, on the user interface of the mobile device, the OCR data in a list or tabular format;

wherein the user actuation is selection by the user of a selectable element on the user interface; and wherein the lacking predetermined check data is missing or is inaccurate.

19. The method of claim 1, wherein receiving the first check image comprises receiving a check image of a front side of the check and a check image of a back side of the check.

* * * * *